US008825943B2

(12) United States Patent
Ishii et al.

(10) Patent No.: US 8,825,943 B2
(45) Date of Patent: Sep. 2, 2014

(54) SEMICONDUCTOR DEVICE AND DRIVING METHOD THE SAME

(75) Inventors: Masato Ishii, Kanagawa-ken (JP);
Yasuyuki Takahashi, Kanagawa (JP);
Takuro Ohmaru, Kanagawa (JP);
Hidetomo Kobayashi, Kanagawa (JP);
Yutaka Shionoiri, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 399 days.

(21) Appl. No.: 12/872,254

(22) Filed: Aug. 31, 2010

(65) Prior Publication Data

US 2011/0055463 A1  Mar. 3, 2011

(30) Foreign Application Priority Data

Sep. 2, 2009  (JP) ................. 2009-202672

(51) Int. Cl.
*G06F 12/02* (2006.01)
(52) U.S. Cl.
USPC ...................... 711/103; 365/185.22
(58) Field of Classification Search
None
See application file for complete search history.

(56) References Cited

U.S. PATENT DOCUMENTS

| | | | |
|---|---|---|---|
| 5,355,336 A | 10/1994 | Yoshioka | |
| 6,073,243 A * | 6/2000 | Dalvi et al. | 726/21 |
| 6,731,536 B1 * | 5/2004 | McClain et al. | 365/185.04 |
| 6,886,087 B2 | 4/2005 | Kaneko et al. | |
| 7,675,358 B2 | 3/2010 | Atsumi | |
| 7,681,801 B2 | 3/2010 | Iwata | |
| 2003/0070034 A1 * | 4/2003 | Friedman et al. | 711/103 |
| 2004/0170059 A1 * | 9/2004 | Turner et al. | 365/185.22 |
| 2006/0010302 A1 | 1/2006 | Yamamoto et al. | |
| 2006/0020746 A1 * | 1/2006 | Brownhill et al. | 711/103 |
| 2007/0147129 A1 * | 6/2007 | Kato | 365/185.22 |
| 2007/0157000 A1 * | 7/2007 | Qawami et al. | 711/170 |
| 2009/0119444 A1 * | 5/2009 | Davis | 711/103 |
| 2009/0207665 A1 * | 8/2009 | Louie et al. | 365/185.22 |
| 2010/0011266 A1 * | 1/2010 | Kurjanowicz | 714/735 |
| 2010/0037000 A1 * | 2/2010 | Kaabouch et al. | 711/103 |

FOREIGN PATENT DOCUMENTS

| | | |
|---|---|---|
| EP | 1617312 A | 1/2006 |
| JP | 61-043387 A | 3/1986 |
| JP | 63-229542 A | 9/1988 |
| JP | 05-266681 A | 10/1993 |
| JP | 09-231329 A | 9/1997 |
| JP | 11-259359 A | 9/1999 |
| JP | 2003-051195 A | 2/2003 |
| JP | 2006-024012 A | 1/2006 |
| JP | 2006-155237 A | 6/2006 |

* cited by examiner

*Primary Examiner* — Kaushihhumar Patel
(74) *Attorney, Agent, or Firm* — Eric J. Robinson; Robinson Intellectual Property Law Office, P.C.

(57) ABSTRACT

In a semiconductor device including a control circuit and a memory, the memory includes at least a sector for preventing additional writing and an information sector. When data for preventing additional writing is written to the sector for preventing additional writing and information is written to the information sector which is electrically connected to the sector for preventing additional writing, additional writing to the information sector is impossible.

6 Claims, 19 Drawing Sheets

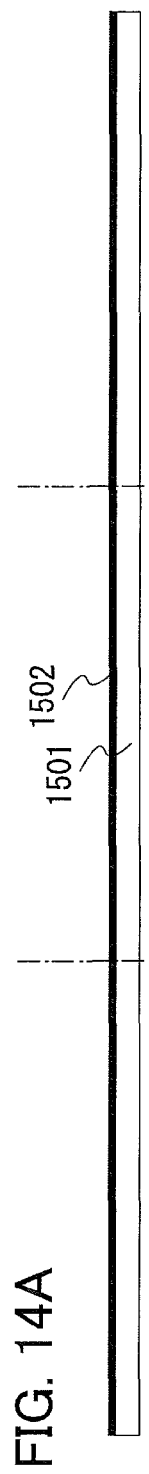
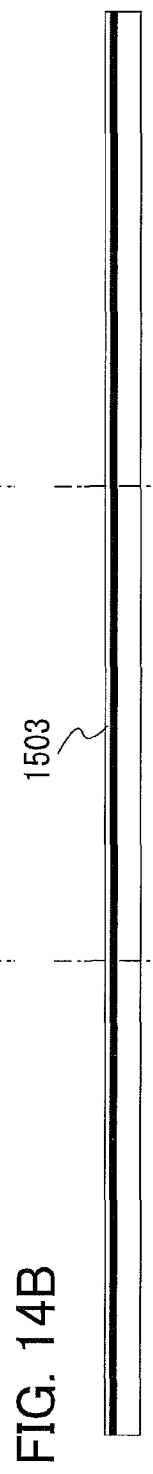
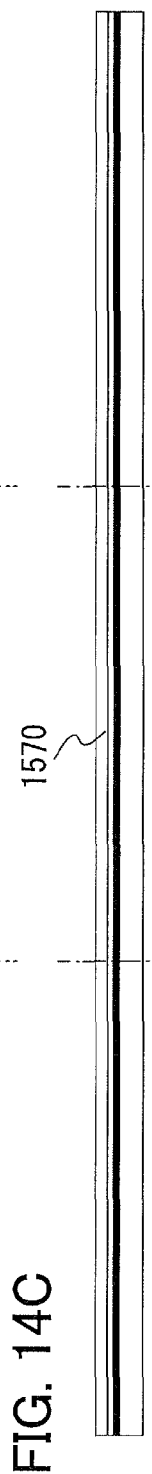
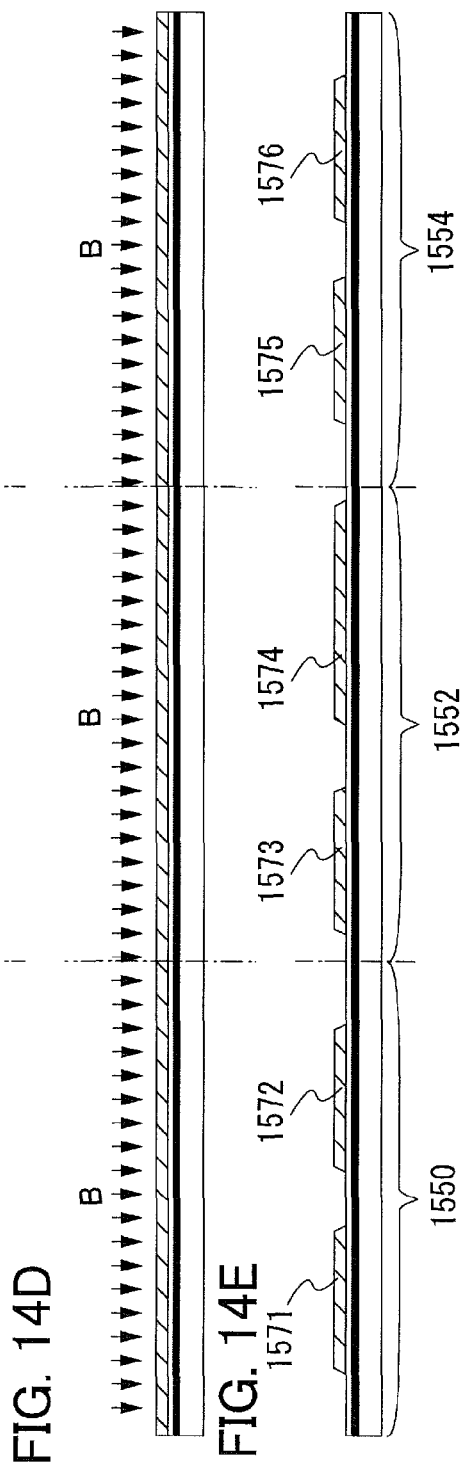
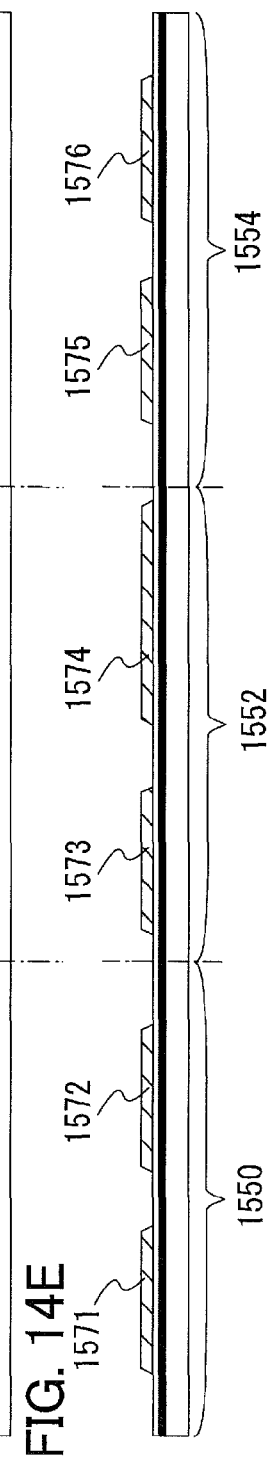
FIG. 14A
FIG. 14B
FIG. 14C
FIG. 14D
FIG. 14E

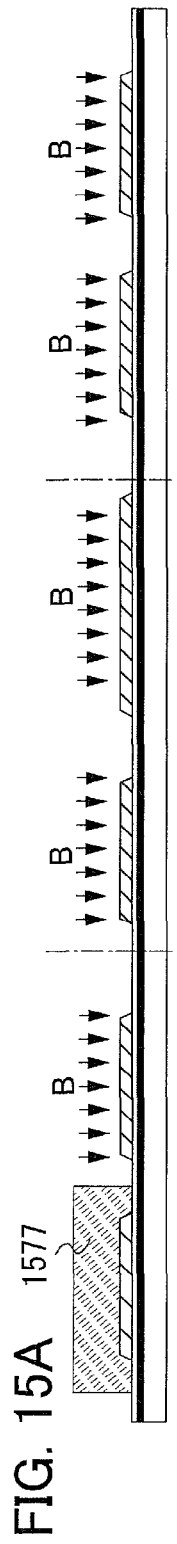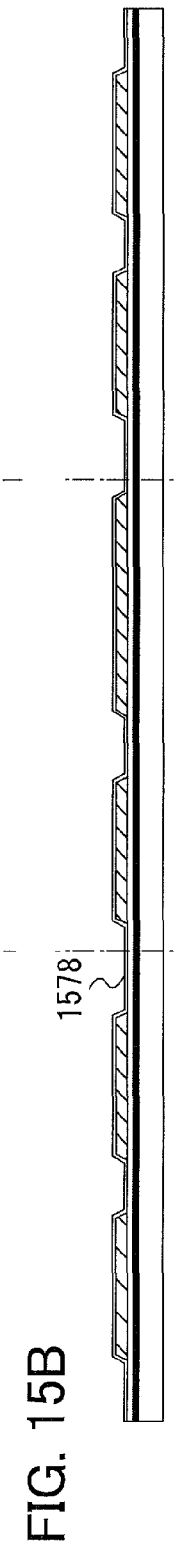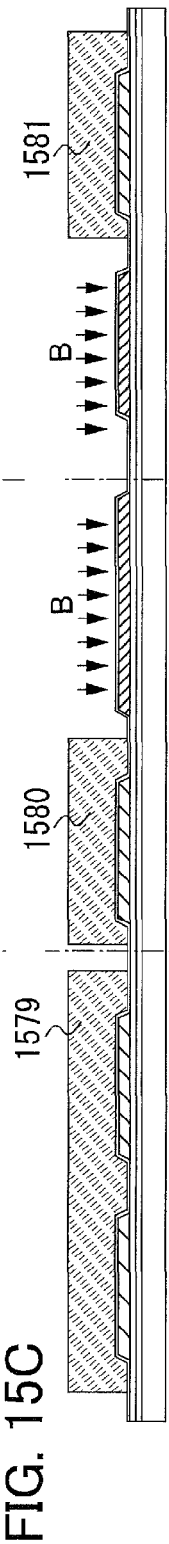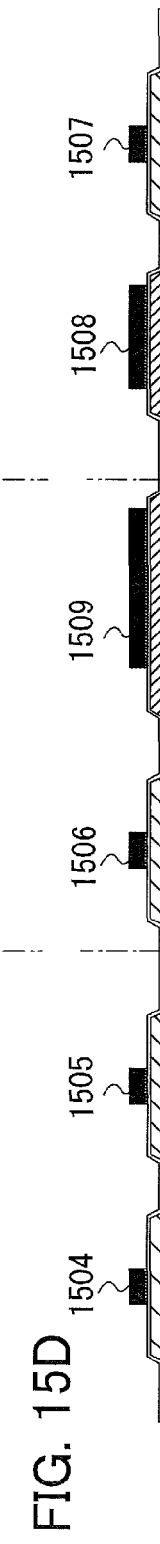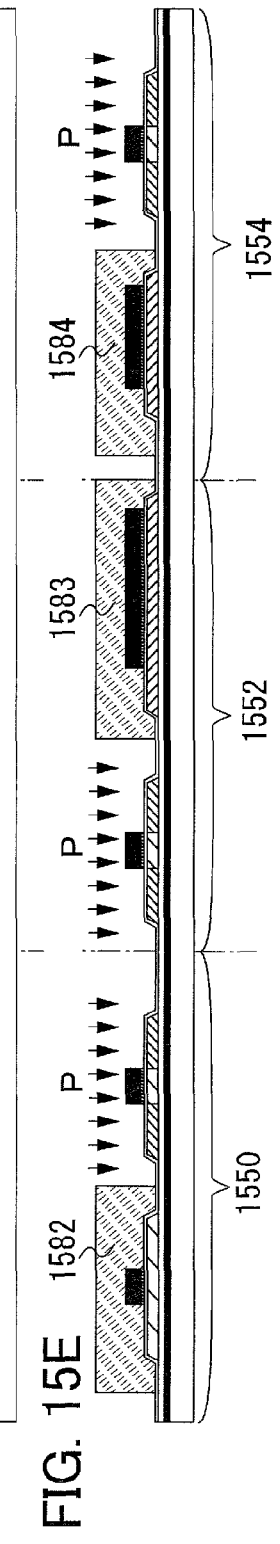

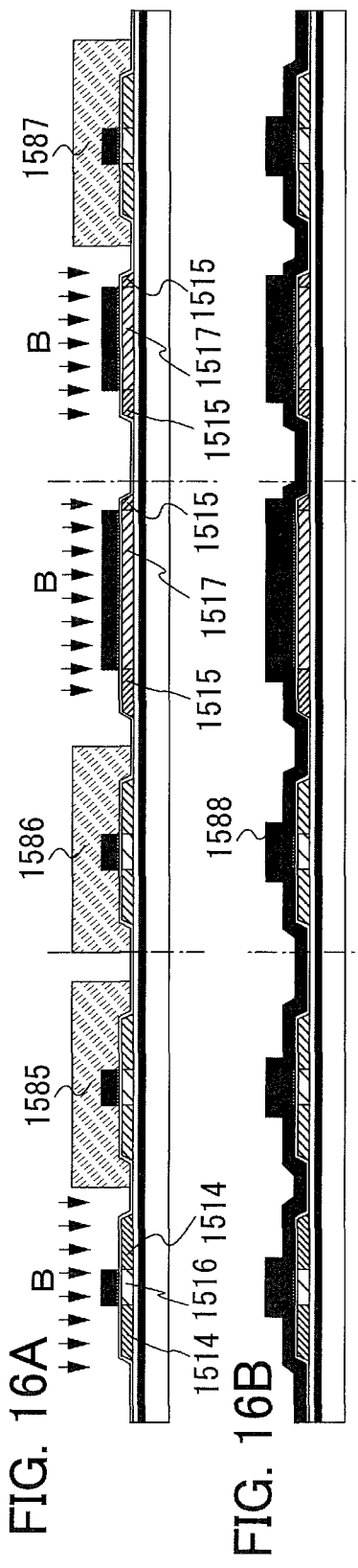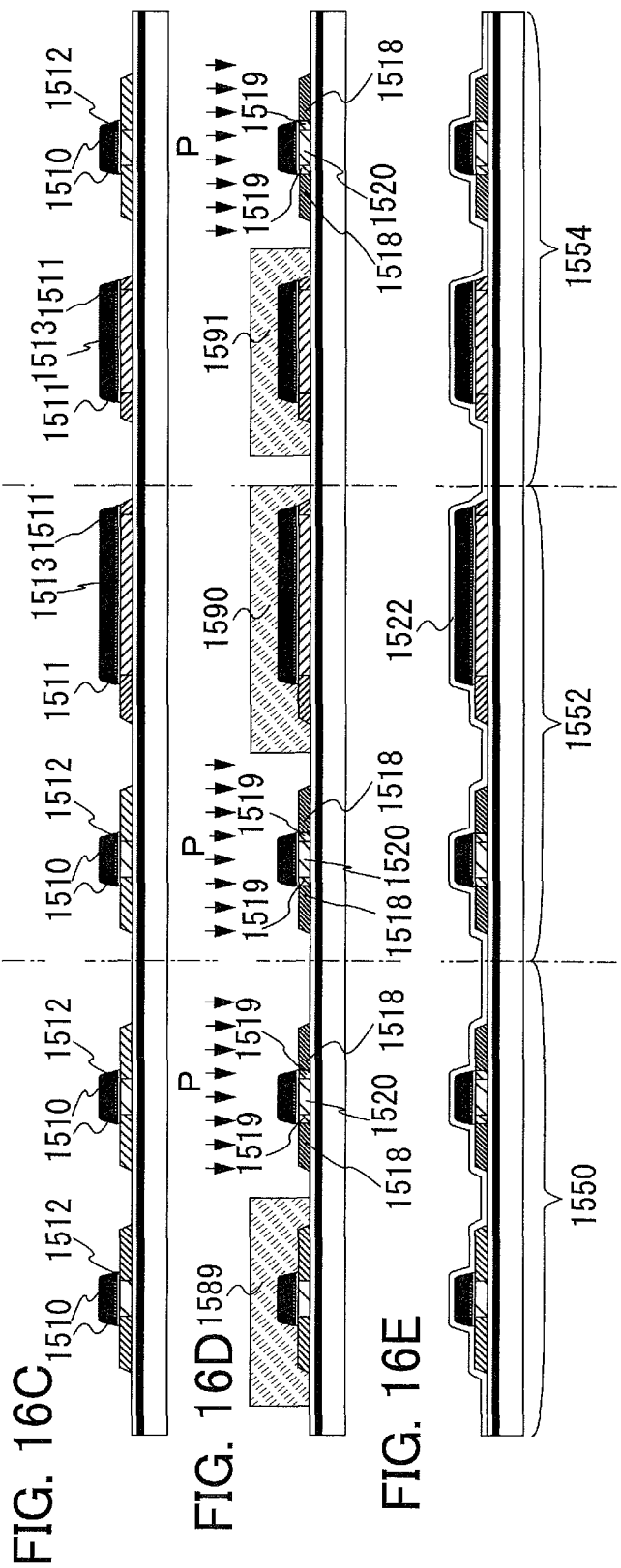

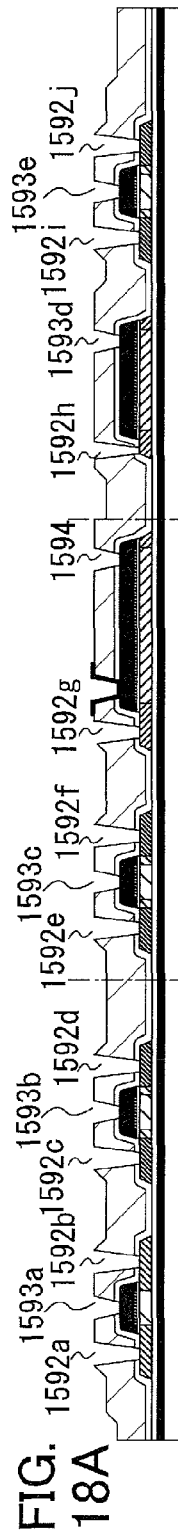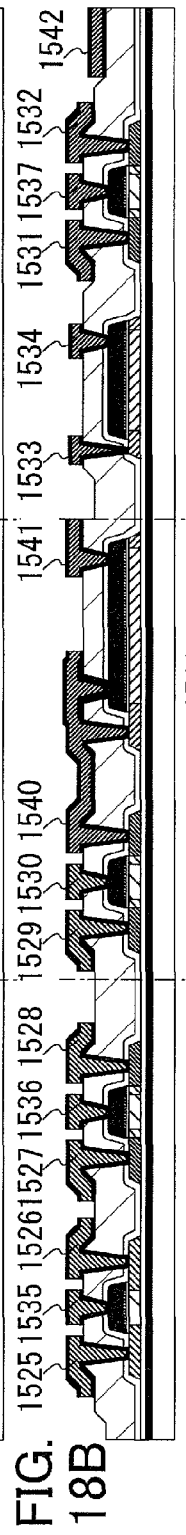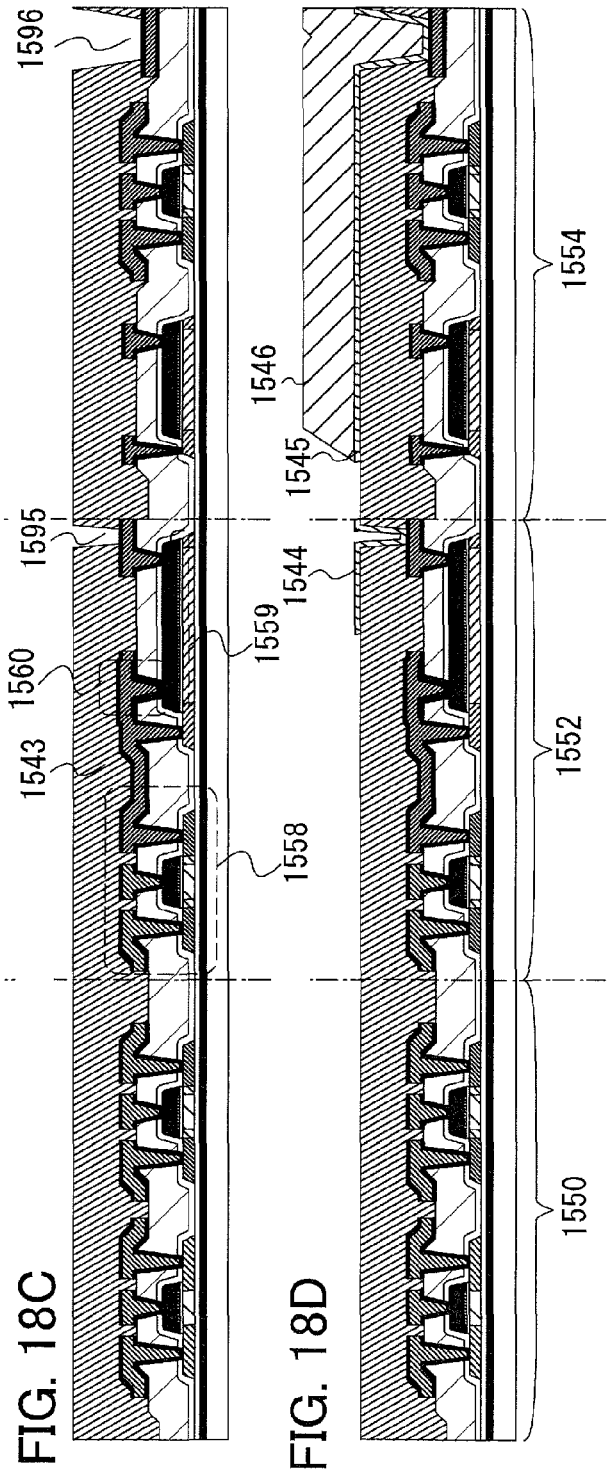

SEMICONDUCTOR DEVICE AND DRIVING METHOD THE SAME

BACKGROUND OF THE INVENTION

1. Field of the Invention

The present invention relates to a semiconductor device which is capable of data communication (reception/transmission) through wireless communication and a driving method thereof.

2. Description of the Related Art

In recent days, an individual identification technique using wireless communication (hereinafter referred to as a wireless communication system) has attracted attention. Specifically, RFID tags (also referred to as IC tags, IC chips, RF tags, wireless tags, or electronic tags) have begun to be used for production, management, and the like of individual objects. In addition, the RFID tags are expected to be used for personal authentication.

The wireless communication system is a system in which data communication is performed by wireless communication between a transmitter/receiver serving also as a power supply source or a transmitter/receiver such as a communication device (also referred to as a reader/writer or an interrogator), and a transmitter/receiver such as an RFID tag (hereinafter referred to as an RFID tag).

In many cases, RFID tags are provided with memories in order to be utilized for production, management, and the like of the above-described individual objects. For example, production history can be recorded when the RFID tag is provided with a nonvolatile memory.

As the memories mounted on the RFID tags, there are a mask ROM (MROM), a one time programmable (OTP) memory, a write-once memory, and the like, in addition to the nonvolatile memory.

The OTP memory and the write-once memory are memories which can be written additionally. The OTP memory and the write-once memory have a plurality of memory cells. In addition, the OTP memory and the write-once memory have an advantage in that the memory cells which have been written once cannot be written additionally. That is, data in the memory cells which have been written once is not changed. Thus, the OTP memory and the write-once memory are suitable for applications which need high safety, for example, production control of food, management of medical goods, and the like because data should not be tampered. However, the memory cells which are not written can be written additionally. Therefore, it is possible that information which has been written once is rewritten.

Patent Document 1 is an example of a method for preventing recorded information from being tampered.

In Patent Document 1, an object is to protect data recorded in an IC tag in order to prevent the data from being tampered. The IC tag is provided with a label which is attached on a surface of a base material of an inlet and which can be peeled, a switch which is set so that the switch is damaged when this label is peeled, and a memory in which writing is inhibited when this switch is damaged. Writing to the memory is inhibited when the label of the inlet is peeled. Accordingly, the recorded information can be surely protected at the time of peeling of the label.

Patent Document 1 is effective for preventing data from being tampered, but a procedure is complicated because a damaging process is included; therefore, a place where such a memory is really used might be confused.

REFERENCE

Patent Document 1: Japanese Published Patent Application No. 2006-155237

SUMMARY OF THE INVENTION

In view of the foregoing problem, it is an object to prevent miswriting by radio in a relatively easy way in a semiconductor device which is capable of data communication (reception/transmission) through wireless communication, in particular, in an RFID tag provided with an OTP memory or a write-once memory. Alternatively, it is an object to prevent information from being tampered. Further alternatively, it is an object to inhibit access to a memory in a relatively easy way and to inhibit reading of information in a semiconductor device which is capable of data communication (reception/transmission) through wireless communication.

One embodiment of the present invention has the structure described below to solve the above problems.

A semiconductor device of one embodiment of the present invention includes at least an input circuit, a circuit which generates a constant voltage, a control circuit, and an OTP memory or a write-once memory.

One embodiment of the present invention is a semiconductor device including a control circuit, an input circuit, a first memory to which writing can be performed once, and a second memory to which writing can be performed once. The first memory includes a first sector having a plurality of bits. The second memory includes a second sector having a plurality of bits. The first sector and the second sector are electrically connected to each other through the control circuit. First information is input from the input circuit to the control circuit, and the first information is held in the control circuit. Whether second information is held in the first sector is determined by the control circuit. In the case where the second information is held in the first sector, the first information is not input to the second sector from the control circuit, and the first information is not held in the second sector. In the case where the second information is not held in the first sector, the first information is input from the control circuit to the second sector, and the first information is held in the second sector. The second information is input from the control circuit to the first sector, and the second information is held in the first sector.

Another embodiment of the present invention is a semiconductor device including a control circuit, an input circuit, and a memory to which writing can be performed once. The memory includes a first sector having a plurality of bits and a second sector having a plurality of bits. The first sector and the second sector are electrically connected to each other through the control circuit. First information is input from the input circuit to the control circuit, and the first information is held in the control circuit. Whether second information is held in the first sector is determined by the control circuit. In the case where the second information is held in the first sector, the first information is not input to the second sector from the control circuit, and the first information is not held in the second sector. In the case where the second information is not held in the first sector, the first information is input from the control circuit to the second sector, and the first information is held in the second sector. The second information is input from the control circuit to the first sector, and the second information is held in the first sector.

Another embodiment of the present invention is a semiconductor device including a control circuit, an input circuit, a first memory to which writing can be performed once, a second memory to which writing can be performed once, and a third memory to which writing can be performed once. The first memory includes a first sector having a plurality of bits. The second memory includes a second sector having a plurality of bits. The third memory includes a third sector having a plurality of bits. The first sector, the second sector, and the third sector are electrically connected to one another through the control circuit. First information is input from the input circuit to the control circuit, and the first information is held in the control circuit. Whether second information is held in the first sector is determined by the control circuit and whether third information is held in the third sector is determined by the control circuit. In the case where the second information is held in the first sector and the third information is held in the third sector, fourth information is not input to the second sector from the control circuit, and the fourth information is not held in the second sector. In the case where the second information is not held in the first sector and the third information is not held in the third sector, the second information is input from the control circuit to the first sector, the second information is held in the first sector, the fourth information is input from the control circuit to the second sector, the fourth information is held in the second sector. The first information is compared with the fourth information by the control circuit. In the case where the first information does not correspond to the fourth information, input of the fourth information to the second sector and comparison between the first information and the fourth information are repeated by the control circuit until the first information corresponds to the fourth information. In the case where the first information corresponds to the fourth information, the third information is input to the third sector from the control circuit, and the third information is held in the third sector.

Another embodiment of the present invention is a semiconductor device including an input circuit, a control circuit, and a memory to which writing can be performed once. The memory includes a first sector having a plurality of bits, a second sector having a plurality of bits, and a third sector having a plurality of bits. The first sector, the second sector, and the third sector are electrically connected to one another through the control circuit. First information is input from the input circuit to the control circuit, and the first information is held in the control circuit. Whether second information is not held in the first sector is determined by the control circuit and whether third information is held in the third sector is determined by the control circuit. In the case where the second information is held in the first sector and the third information is held in the third sector, fourth information is not input to the second sector from the control circuit, and the fourth information is not held in the second sector. In the case where the second information is not held in the first sector and the third information is not held in the third sector, the second information is input from the control circuit to the first sector, and the second information is held in the first sector, the fourth information is input from the control circuit to the second sector, and the fourth information is held in the second sector. The first information is compared with the fourth information by the control circuit. In the case where the first information does not correspond to the fourth information, input of the fourth information to the second sector and comparison between the first information and the fourth information are repeated by the control circuit until the first information corresponds to the fourth information. In the case where the first information corresponds to the fourth information, the third information is input to the third sector from the control circuit, and the third information is held in the third sector.

In the semiconductor device, the memory is an OTP memory or a write-once memory.

In the semiconductor device, when the information is held, the sector does not suffer a physical change.

Another embodiment of the present invention is a driving method of a semiconductor device including a control circuit, an input circuit, a first memory to which writing can be performed once, and a second memory to which writing can be performed once. The first memory includes a first sector having a plurality of bits, and the second memory includes a second sector having a plurality of bits. The first sector and the second sector are electrically connected to each other through the control circuit. The driving method of a semiconductor device includes the following steps of: inputting first information to the control circuit by the input circuit and holding the first information in the control circuit; determining whether the first sector holds second information by the control circuit; in the case where the first sector holds the second information, not inputting the first information to the second sector from the control circuit and not holding the first information in the second sector; in the case where the first sector does not hold the second information, inputting the first information to the second sector from the control circuit and holding the first information in the second sector; and inputting the second information to the first sector from the control circuit and holding the second information in the first sector.

Another embodiment of the present invention is a driving method of a semiconductor device including a control circuit, an input circuit, and a memory to which writing can be performed once. The memory includes a first sector having a plurality of bits and a second sector having a plurality of bits. The first sector and the second sector are electrically connected to each other through the control circuit. The driving method of a semiconductor device includes the following steps of: inputting first information to the control circuit by the input circuit and holding the first information in the control circuit; determining whether the first sector holds second information by the control circuit; in the case where the first sector holds the second information, not inputting the first information to the second sector from the control circuit and not holding the first information in the second sector; in the case where the first sector does not hold the second information, inputting the first information to the second sector from the control circuit and holding the first information in the second sector; and inputting the second information to the first sector from the control circuit and holding the second information in the first sector.

Another embodiment of the present invention is a driving method of a semiconductor device including a control circuit, an input circuit, a first memory to which writing can be performed once, a second memory to which writing can be performed once, and a third memory to which writing can be performed once. The first memory includes a first sector having a plurality of bits, the second memory includes a second sector having a plurality of bits, and the third memory includes a third sector having a plurality of bits. The first sector, the second sector, and the third sector are electrically connected to one another through the control circuit. The driving method of a semiconductor device includes the following steps of: inputting first information to the control circuit by the input circuit and holding the first information in the control circuit; determining whether the first sector holds second information and whether the third sector holds third information by the control circuit; in the case where the first sector holds the second information and the third sector holds the third information, not inputting the first information to the second sector from the control circuit and not holding the first information in the second sector; in the case where the first sector does not hold the second information and the third sector does not hold the third information, inputting the second information to the first sector from the control circuit and holding the second information in the first sector; inputting fourth information to the second sector from the control circuit and holding the fourth information in the second sector; comparing the first information and the fourth information by the control circuit; in the case where the first information does not correspond to the fourth information, repeating input of the fourth information to the second sector and comparison between the first information and the fourth information by the control circuit until the first information corresponds to the fourth information; and in the case where the first information corresponds to the fourth information, inputting the third information to the third sector from the control circuit, and holding the third information in the third sector.

Another embodiment of the present invention is a driving method of a semiconductor device including an input circuit, a control circuit, and a memory to which writing can be performed once. The memory includes a first sector having a plurality of bits, a second sector having a plurality of bits, and a third sector having a plurality of bits. The first sector, the second sector, and the third sector are electrically connected to one another through the control circuit. The driving method of a semiconductor device includes the following the steps of: inputting first information to the control circuit by the input circuit and holding the first information in the control circuit; determining whether the first sector holds second information and whether the third sector holds third information by the control circuit; in the case where the first sector holds the second information and the third sector holds the third information, not inputting the first information to the second sector from the control circuit and not holding the first information in the second sector; in the case where the first sector does not hold the second information and the third sector does not hold the third information, inputting the second information to the first sector from the control circuit and holding the second information in the first sector; inputting fourth information to the second sector from the control circuit and holding the fourth information in the second sector; comparing the first information and the fourth information by the control circuit; in the case where the first information does not correspond to the fourth information, repeating input of the fourth information to the second sector and comparison between the first information and the fourth information by the control circuit until the first information corresponds to the fourth information; and in the case where the first information corresponds to the fourth information, inputting the third information to the third sector from the control circuit, and holding the third information in the third sector.

In the driving method of a semiconductor device, the memory is an OTP memory or a write-once memory.

In the driving method of a semiconductor device, when the information is held, the sector does not suffer a physical change.

In a semiconductor device including at least a control circuit and an OTP memory or a write-once memory (hereinafter, the OTP memory and the write-once memory are each referred to as a memory), the memory includes at least a plurality of memory bits (hereinafter referred to as a sector for preventing additional writing) to which data that prevents additional writing is written, and a plurality of memory bits (hereinafter referred to as an information sector) to which information is written. When data for preventing additional wiring is written to the sector for preventing additional writing and information is written to the information sector which is electrically connected to the sector for preventing additional writing, the information sector to which information has been written cannot be written additionally.

Therefore, when data for preventing additional writing is written to the sector for preventing additional writing of the memory included in the semiconductor device, information is written to the information sector which is electrically connected to the sector for preventing additional writing, and the information is held, written information is confirmed and additional writing becomes impossible. Accordingly, miswriting and tampering of data are prevented.

Further, when a sector for determining whether writing is possible is provided for the memory, it is confirmed that information is not surely written to the information sector, and correct information can be accurately written at the time of writing to the information sector, whereby occurrence of causing defects such as writing defects is reduced, and reliability of wireless communication between the RFID tag and a communication device or the like is improved.

Therefore, reliability of the RFID tag is improved when the sector for preventing additional writing and the sector for determining whether writing is possible are provided.

In the case where a sector for inhibiting writing is used instead of the sector for preventing additional writing, data for inhibiting writing is written to the sector for inhibiting writing, information is written to the information sector electrically connected to the sector for inhibiting writing, and the information is held. Further, when data for inhibiting writing is written to the sector for inhibiting writing, access to the memory can be completely interrupted. Thus, data which becomes unnecessary is prevented from being leaked.

BRIEF DESCRIPTION OF THE DRAWINGS

FIGS. 14A to 14E are cross-sectional views illustrating a method for manufacturing a semiconductor device in an embodiment of the invention.

FIGS. 15A to 15E are cross-sectional views illustrating a method for manufacturing a semiconductor device in an embodiment of the invention.

FIGS. 16A to 16E are cross-sectional views illustrating a method for manufacturing a semiconductor device in an embodiment of the invention.

FIGS. 18A to 18D are cross-sectional views illustrating a method for manufacturing a semiconductor device in an embodiment of the invention.

DETAILED DESCRIPTION OF THE INVENTION

Figure 1:
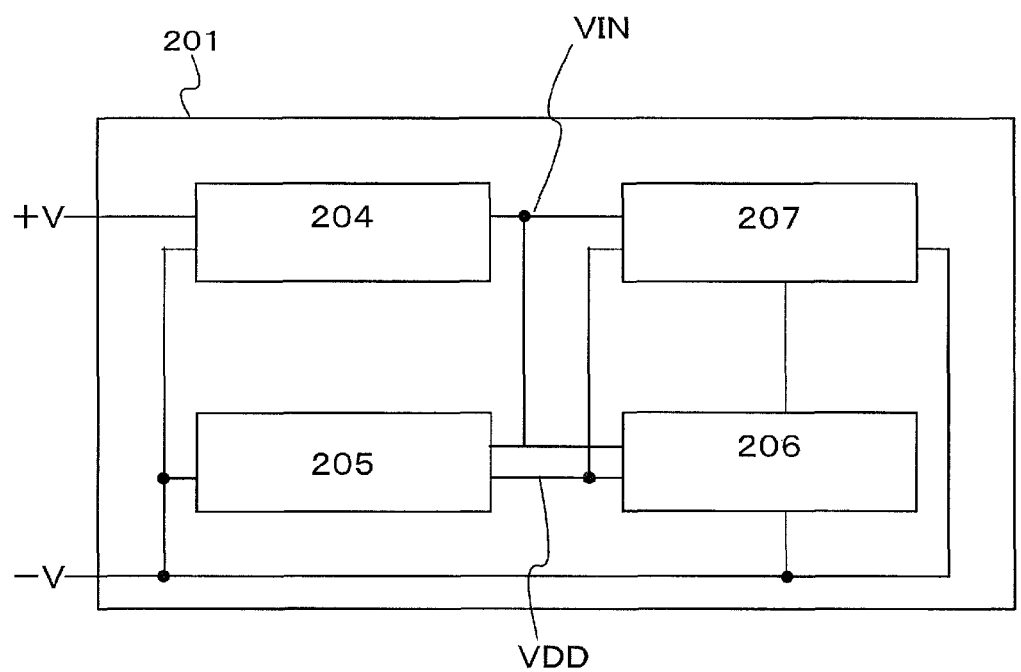
FIG. 1 is a block diagram illustrating a semiconductor device in an embodiment of the invention.

Embodiments of the present invention will be described below with reference to the accompanying drawings. Note that the present invention is not defined to description below, and it is easily understood by those skilled in the art that modes and details can be modified in various ways without departing from the spirit and scope of the present invention. Therefore, the present invention should not be interpreted as being limited to what is described in the embodiments described below.

Note that identical portions or portions having the same function in all drawings illustrating the structure of one embodiment of the present invention that are described below are denoted by the same reference numerals.

Further, in the present invention, the term "being connected" is synonymous with the term "being electrically connected". Therefore, another element or the like may be provided between elements.

Data is data which is encoded or converted to signals, which is suitable for transmission or processing of information or the like. In addition, information is data with a meaning or the group of data. Therefore, information is a kind of data.

That is, in this specification, data includes data as an instruction to write to a memory, an instruction to prevent writing, or the like as well as information. Specifically, data includes information held in the information sector; data (data for preventing additional writing, data for determining whether writing is possible, or the like) held in the sector for preventing additional writing, the sector for determining whether writing is possible, or the like; and an instruction to write to the memory. Information is information which is held in the information sector.

When data communication (reception/transmission) is performed through wireless communication, data is transmitted as an instruction from a communication device (an antenna) to an RFID tag. This instruction is data for writing, preventing writing, or the like as well as information written to the information sector.

Note that in this specification, the sector may be either one bit or the group of a plurality of bits. That is, the sector means the group of one or more bits.

The information sector is a sector to which info information included in data that is transmitted from the communication device (antenna) to the RFID tag is written.

The sector for preventing additional writing is a sector which is provided so that the information sector to which writing has been performed is prevented from being rewritten after information is written once to the information sector which is electrically connected to the sector for preventing additional writing. Data for preventing additional writing is data to be written to the sector for preventing additional writing. There is no particular limitation on the size of the data, and one or more bits of data may be used.

The sector for determining whether writing is possible means a sector provided so as to confirm that no information is written to the sectors such as the information sector which performs writing. Data for determining whether writing is possible means that data to be written to the sector for determining whether writing is possible. There is no particular limitation on the size of the data, and one or more bits of data may be used.

Embodiment 1

In this embodiment, a configuration of a semiconductor device of one embodiment of the present invention that is capable of communicating data through wireless communication will be described.

Figure 3:
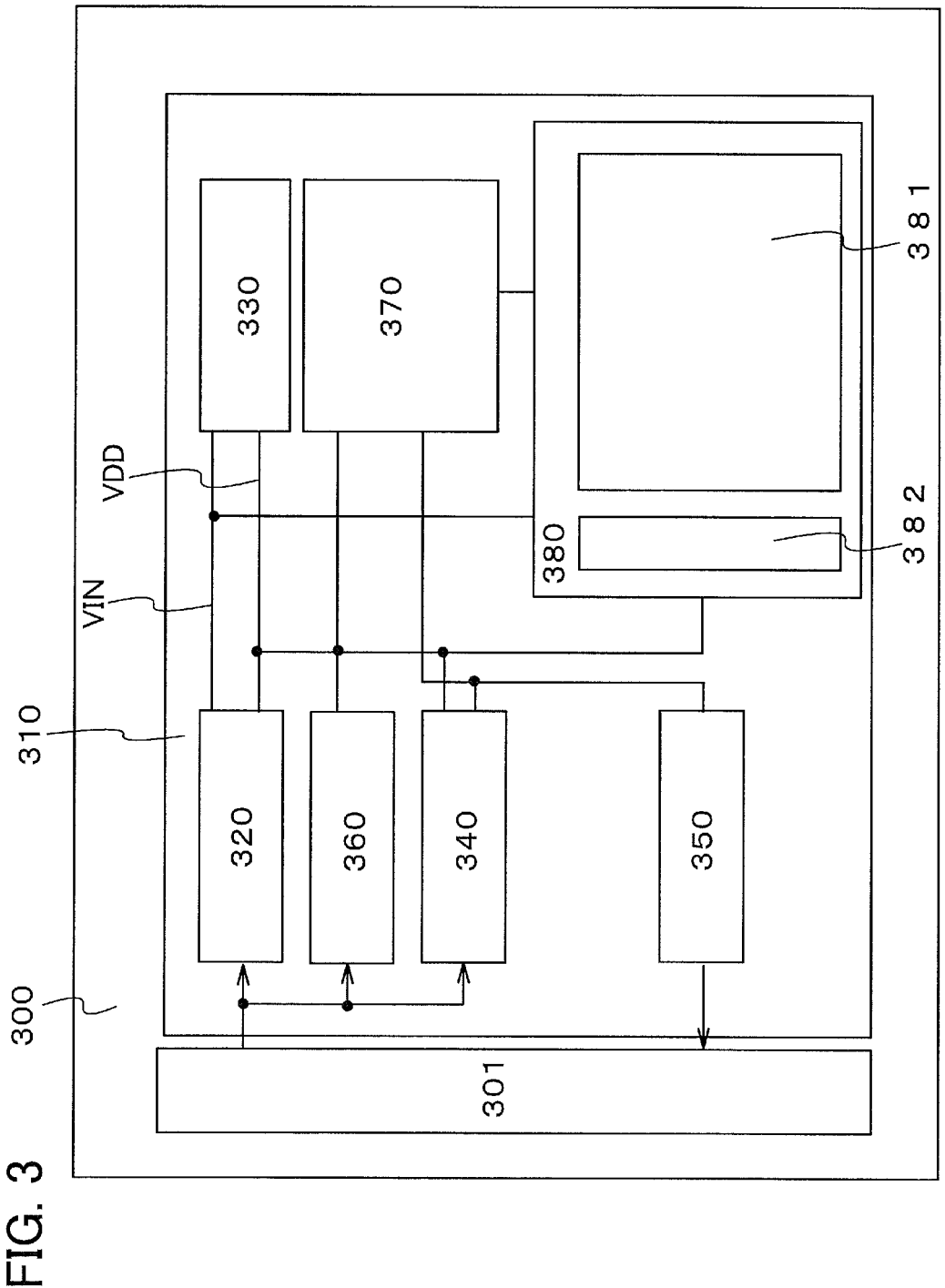
FIG. 3 is a block diagram illustrating an RFID tag in an embodiment of the invention.

As illustrated in FIG. 1, a semiconductor device 201 includes an input circuit 204, a circuit 205 which generates a constant voltage, a control circuit 206, and an OTP memory or write-once memory (hereinafter referred to as a memory) 207. In this embodiment, an RFID tag using the semiconductor device 201 in FIG. 1 will be described with reference to FIG. 3. As illustrated in FIG. 3, the case where a memory 380 includes an information sector 381 and a sector for preventing additional writing 382 is described. The information sector 381 and the sector for preventing additional writing 382 are electrically connected to each other.

An input circuit 320 rectifies an input AC signal to generate a DC voltage. Any circuit configuration can be employed as long as the circuit rectifies an input signal to generate a DC voltage. For example, a circuit configuration is given in which a rectifier circuit such as a half-wave rectifier circuit or a full-wave rectifier circuit is combined with an element such as a capacitor or a coil.

A circuit 330 generates a constant voltage which is lower than or equal to a DC voltage generated by the input circuit 320. Any circuit configuration can be employed as long as the circuit can keep a voltage constant which is generated by using either or both of a voltage and/or a current. For example, a regulator is given.

A control circuit 370 is a block (circuit) analyzing data received by the semiconductor device through wireless communication.

The OTP memory or write-once memory 380 is referred to as a memory to which writing can be performed only once. Any memory can be used as long as writing can be performed to the memory only once.

In the case where the received data is written to the memory 380, when a semiconductor integrated circuit 310 receives data, the control circuit 370 analyzes the received data. As a result of analysis, the control circuit 370 recognizes the received data as information, data for preventing additional writing, or the like.

The control circuit determines whether data for preventing additional writing is written by reading the sector for preventing additional writing.

In the case where data for preventing additional writing is written to the sector for preventing additional writing, the control circuit 370 transmits an error code to the communication device or the like through wireless communication.

In the case where data for preventing additional writing is not written to the sector for preventing additional writing, the control circuit 370 writes information to the information sector 381. The information sector 381 holds the information.

Further, the control circuit 370 writes data for preventing additional writing to the sector for preventing additional writing 382. Then, the sector for preventing additional writing 382 holds the data for preventing additional writing.

When the data for preventing additional writing is written to the sector for preventing additional writing 382 by the control circuit 370, the information written to the information sector 381 is changed to a state where additional writing is impossible. That is, the control circuit 370 controls the information sector electrically connected to the sector for preventing additional writing 382 to which the data for preventing additional writing is written so as not to perform writing. Therefore, the information sector electrically connected to the sector for preventing additional writing 382 to which the data for preventing additional writing is written becomes a state where additional writing is impossible.

With the configuration, when information is written to the information sector 381, data for preventing additional writing is written to the sector for preventing additional writing 382. Thus, the information sector 381 is changed to a state where additional writing is impossible.

Therefore, even in the case where information is rewritten to the information sector 381, additional writing is not performed on the information sector 381 to which information has already been written. That is, without change of the information which has already been written to the memory once, miswriting and tampering of information can be prevented.

Figure 5:
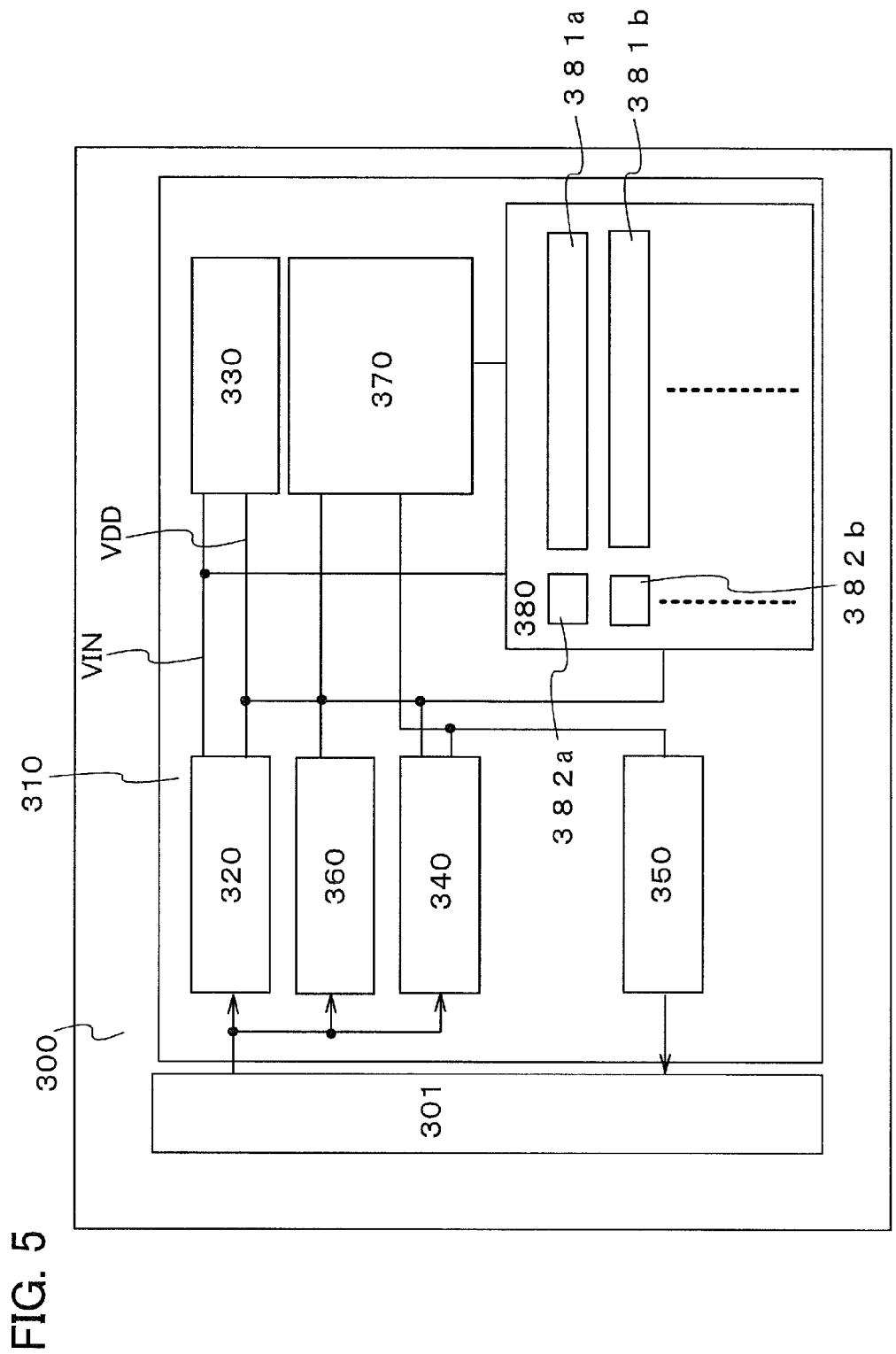
FIG. 5 is a block diagram illustrating an RFID tag in an embodiment of the invention.

Although not illustrated in FIG. 1, in this embodiment, a structure in which the sector for preventing additional writing and the information sector are, provided in one memory is described; however, one embodiment of the present invention is not limited to this structure. As illustrated in FIG. 5, a structure where sectors for preventing additional writing (382a and 382b) and information sectors (381a and 381b) are each provided separately and these sectors are electrically connected to each other may be used. That is, a plurality of memories in accordance with respective applications, for example, a memory only for the sectors for preventing additional writing (382a and 382b) and a memory only for the information sectors (381a and 381b) may be provided.

Figure 7:
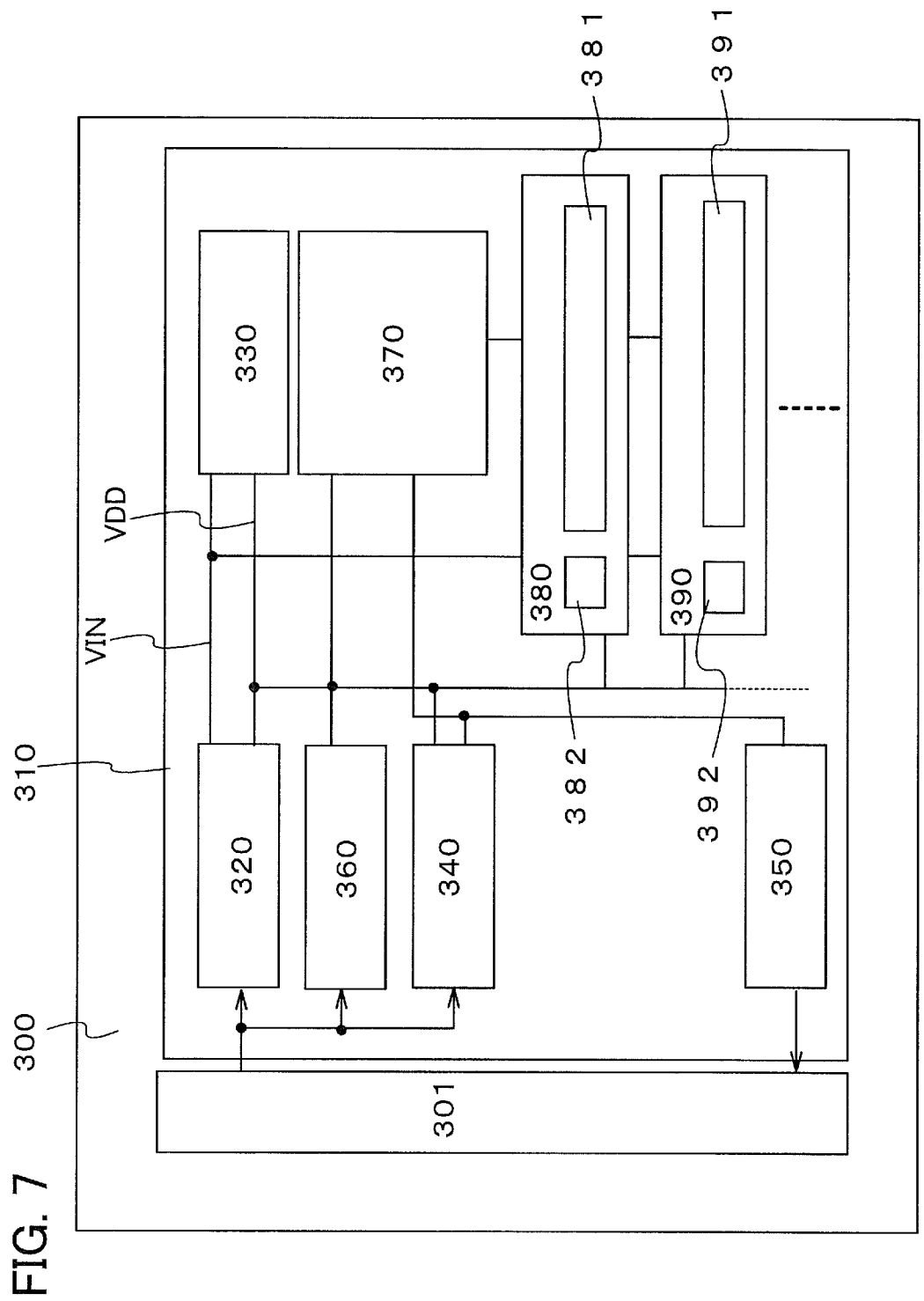
FIG. 7 is a block diagram illustrating an RFID tag in an embodiment of the invention.

Further, the structure in which the sector for preventing additional writing and the information sector are provided in one memory is described; however, one embodiment of the present invention is not particularly limited to the structure in which only one for each of various sectors is provided. For example, as illustrated in FIG. 7, a structure in which a plurality of information sectors (381 and 391) is provided and a plurality of sectors for preventing additional writing (382 and 392) which is electrically connected to respective information sectors is provided may be used, and there is no particular limitation on the structure of the sectors. In this case, the information sectors which are electrically connected to the sectors for preventing additional writing can be prevented from miswriting and tampering of information without change of information which has been written to the memory once.

A sector for inhibiting writing may be provided instead of the sector for preventing additional writing. In this case, the sector for inhibiting writing is provided instead of the sector for preventing additional writing, so that access to the memory is completely interrupted to be in an inhibited state where access to the memory is inhibited without change of the data which has been written to the memory once.

When data for inhibiting writing is held in the sector for inhibiting writing, the control circuit is made to recognize the interruption of access to the memory. Therefore, the control circuit may have a structure in which access to the memory is interrupted when data is held in a specific sector in the memory.

This embodiment can be combined with any of the other embodiments, as appropriate.

Embodiment 2

In this embodiment, a structure of a semiconductor device of one embodiment of the present invention which can perform data communication through wireless communication and which is different from the structure described in Embodiment 1 will be described.

Figure 4:
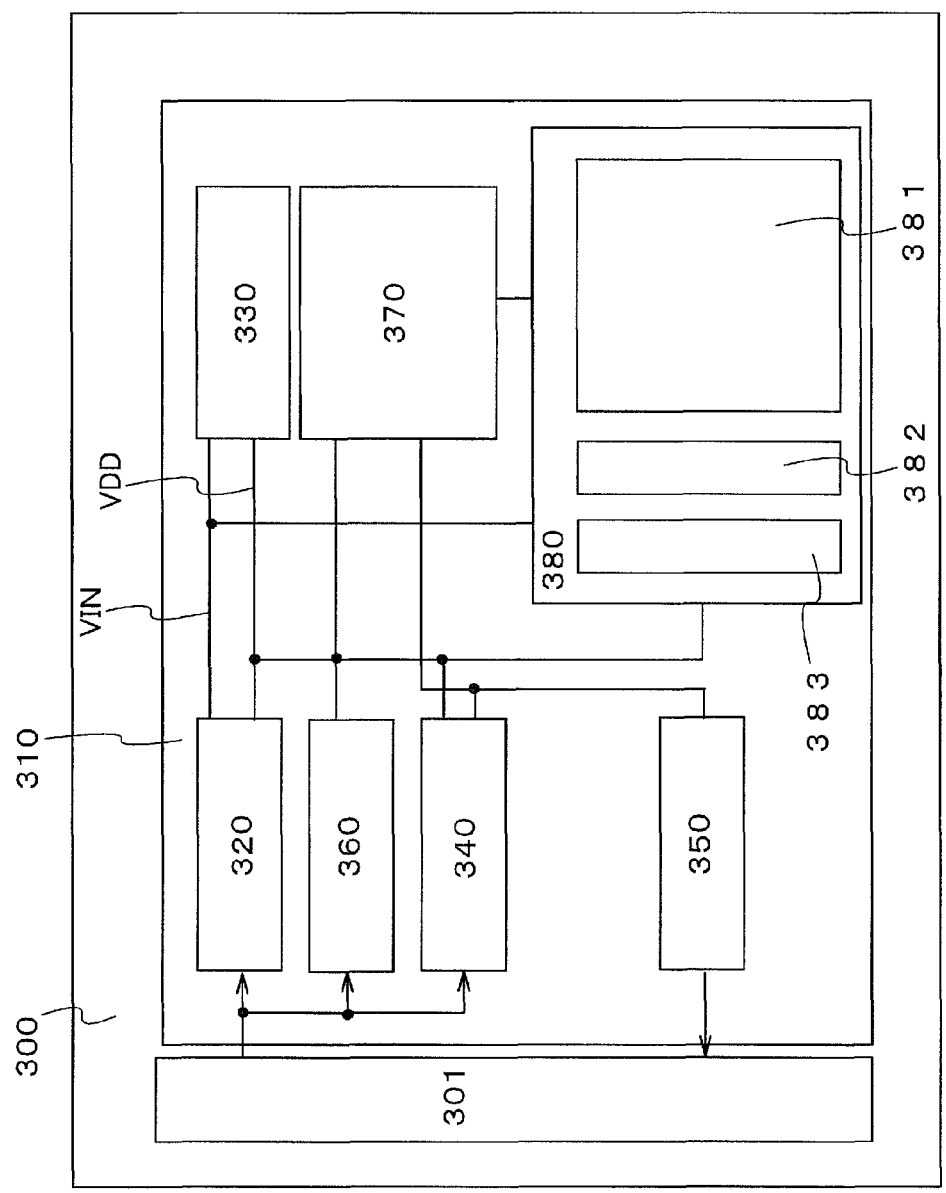
FIG. 4 is a block diagram illustrating an RFID tag in an embodiment of the invention.

As illustrated in FIG. 1, the semiconductor device 201 includes the input circuit 204, the circuit 205 which generates a constant voltage, the control circuit 206, and the memory 207. In Embodiment 2, an RFID tag using the semiconductor device 201 in FIG. 1 will be described with reference to FIG. 4. As illustrated in FIG. 4, the case where the memory 380 includes the information sector 381, the sector for preventing additional writing 382, and a sector for determining whether writing is possible 383 is described. A semiconductor integrated circuit illustrated in FIG. 4 is the same as the semiconductor integrated circuit described in Embodiment 1 except the structure of the memory. Note that the information sector 381, the sector for preventing additional writing 382, and the sector for determining whether writing is possible 383 are electricity connected to one another.

The input circuit 320, the circuit 330 which generates a constant voltage, and the control circuit 370 have the same structures as those described in Embodiment 1. An OTP memory or write-once memory is used for the memory 380 as in Embodiment 1.

In the case where data is written to the memory 380, when the semiconductor integrated circuit 310 receives data, the control circuit 370 analyzes the received data. As a result of analysis, the control circuit 370 recognizes the received data as information, data for determining whether writing is possible, data for preventing additional writing, or the like.

The control circuit 370 reads the memory 380. The control circuit 370 determines whether data (data for preventing additional writing and data for determining whether writing is possible) is written to the sector for preventing additional writing 382 and the sector for determining whether writing is possible 383 in the memory 380.

In the case where data is written to the sector for preventing additional writing 382 and the sector for determining whether writing is possible 383, an error code is supplied, and writing to the memory is stopped.

The sector for determining whether writing is possible 383 functions as a test sector of writing data provided for determining whether power is sufficiently input for writing data to the information sector and the like (a sector except the sector for determining whether writing is possible) which are electrically connected to the sector for determining whether writing is possible 383.

Note that by the control circuit, the sector for determining whether writing is possible and the sector for preventing additional writing are read and checked whether data is written to the sectors; however, there is no particular limitation. As a method for checking whether data is written to the information sector and the like (sectors except the sector for determining whether writing is possible and the sector for preventing additional writing) which are electrically connected to the sector for determining whether writing is possible and the sector for preventing additional writing, a method may be used by which the control circuit reads data or information from the information sector and the like which are electrically connected to the sector for determining whether writing is possible and the sector for preventing additional writing, and checks whether the data or the information is written to the information sector and the like which are electrically connected to the sector for determining whether writing is possible and the sector for preventing additional writing.

In the case where data is not written to the sector for preventing additional writing 382 and the sector for determining whether writing is possible 383, the control circuit 370 writes data for determining whether writing is possible to the sector for determining whether writing is possible 383. The sector for determining whether writing is possible 383 holds the data for determining whether writing is possible.

When information is written to the information sector 381 electrically connected to the sector for determining whether writing is possible 383, the data for determining whether writing is possible is written to the sector for determining whether writing is possible 383. Therefore, when the control circuit 370 writes the received data to the memory 380, the control circuit 370 reads the memory 380 and checks whether the data for determining whether writing is possible is written to the sector for determining whether writing is possible 383 and checks that data of informational is not written to the information sector 381.

Thus, the received data can be accurately written at the time of writing to the memory 380 by provision of the sector for determining whether writing is possible 383. Therefore, the occurrence of causing defects such as writing defects is reduced.

The control circuit 370 writes information to the information sector 381. The information sector 381 holds the information.

Further, the control circuit 370 writes data for preventing additional writing to the sector for preventing additional writing 382. Then, the sector for preventing additional writing 382 holds the data for preventing additional writing.

When the data for preventing additional writing is written to the sector for preventing additional writing 382 by the control circuit 370, the information written to the information sector 381 is changed to a state where additional writing is impossible. That is, the control circuit 370 controls the information sector electrically connected to the sector for preventing additional writing 382 to which the data for preventing additional writing is written so as not to perform writing. Therefore, the information sector electrically connected to the sector for preventing additional writing 382 to which the data for preventing additional writing is written becomes a state where additional writing is impossible.

With the above structure, when information is written to the information sector 381, data for preventing additional writing is written to the sector for preventing additional writing 382. Thus, the information sector 381 becomes a state where additional writing is impossible.

Therefore, even when information is rewritten to the information sector 381, the information sector 381 to which information has already been written is not additionally written. That is, miswriting and tampering of information can be prevented without change of the information which has been written to the information sector 381.

Further, the sector for determining whether writing is possible 383 is provided, so that it can be checked whether information is written to the information sector 381 electrically connected to the sector for determining whether writing is possible 383. At the time of writing from the control circuit 370 to the information sector 381 electrically connected to the sector for determining whether writing is possible 383, correct information can be accurately written, occurrence of causing defects such as writing defects is reduced, and reliability of wireless communication between the RFID tag and the communication device or the like is improved.

Figure 8:
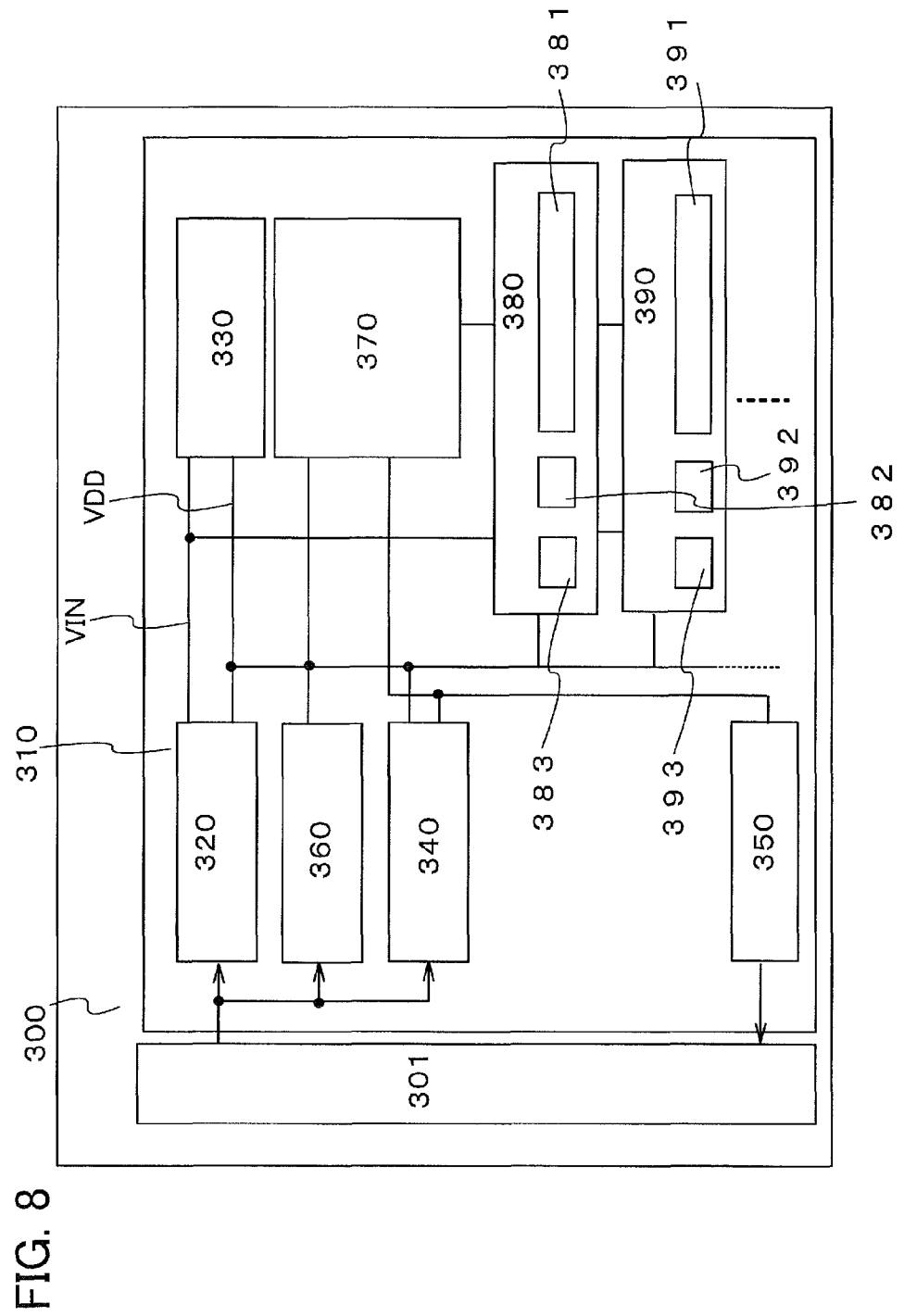
FIG. 8 is a block diagram illustrating an RFID tag in an embodiment of the invention.

Although not illustrated in FIG. 1, the structure in which the sector for preventing additional writing, the information sector, and the sector for determining whether writing is possible are provided in one memory is described in this embodiment. However, one embodiment of the present invention is not limited to this structure, and as illustrated in FIG. 8, a structure where the memory 380 is provided with the sector for preventing additional writing 382, the information sector 381, and the sector for determining whether writing is possible 383, and a memory 390 is provided with the sector for preventing additional writing 392, the information sector 391, and a sector for determining whether writing is possible 393, and these are electrically connected to each other may be used. That is, a plurality of memories in accordance with respective applications, for example a memory only for the sectors for preventing additional writing, a memory only for the information sectors, and a memory only for the sectors for determining whether writing is possible may be provided.

Figure 6:
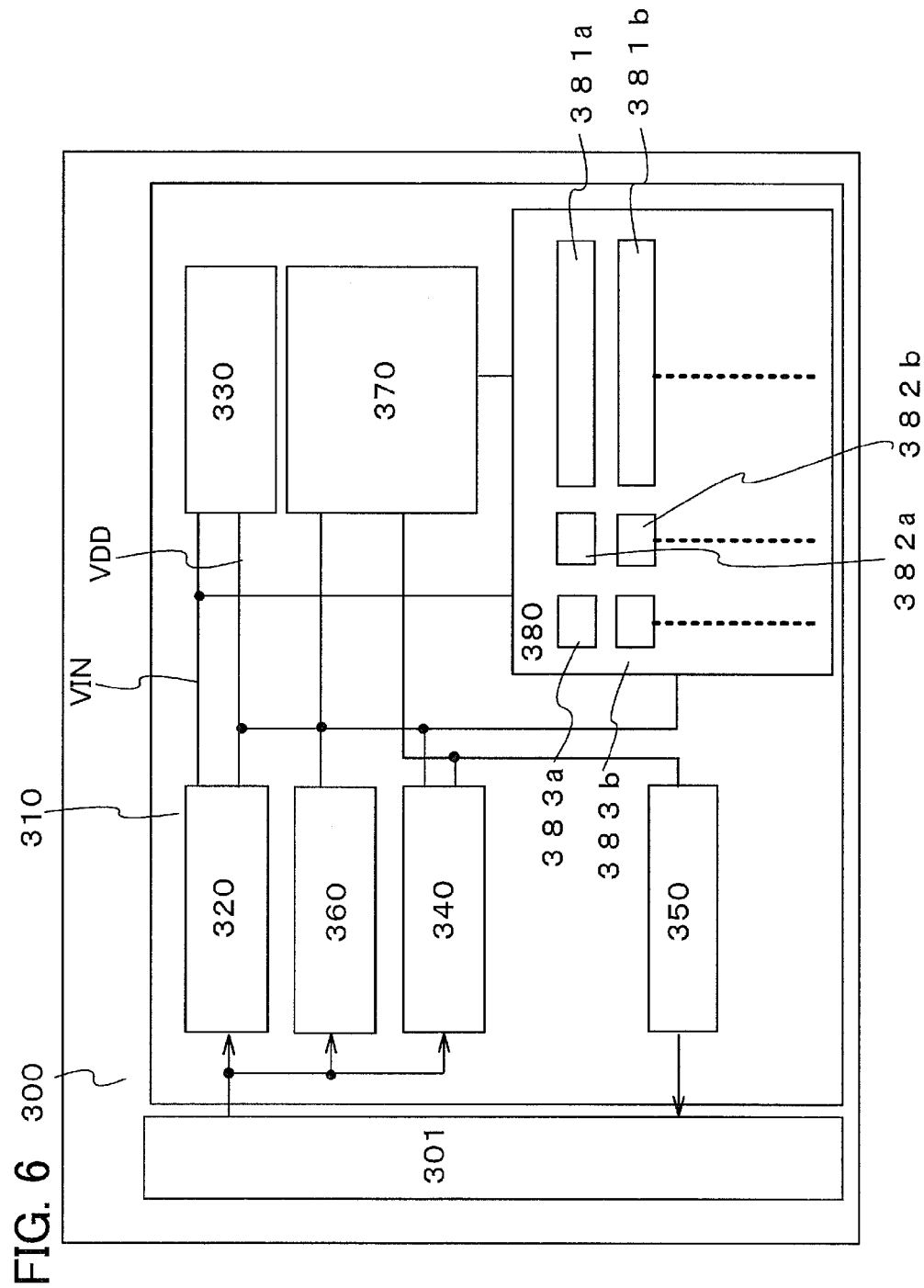
FIG. 6 is a block diagram illustrating an RFID tag in an embodiment of the invention.

Further, the structure in which the sector for determining whether writing is possible, the sector for preventing additional writing, and the information sector are provided in one memory is described; however, one embodiment of the present invention is not particularly limited to the structure in which only one for each of various sectors is provided. For example, as illustrated in FIG. 6, a structure in which the plurality of information sectors (381a and 381b) is provided, and the plurality of sectors for preventing additional writing (382a and 382b) and a plurality of sectors for determining whether writing is possible (383a and 383b) which are electrically connected to respective information sectors are provided may be used, and there is no particular limitation on the structure of the sectors. In this case, the information sectors which are electrically connected to the sectors for preventing additional writing and the sectors for determining whether writing is possible can be prevented from miswriting and tampering of information without change of information which has been written to the memory once.

This embodiment can be combined with any of the other embodiments, as appropriate.

Embodiment 3

In this embodiment, a structure and operation of a semiconductor device of one embodiment of the present invention when it is provided for an RFID tag will be described.

Figure 9:
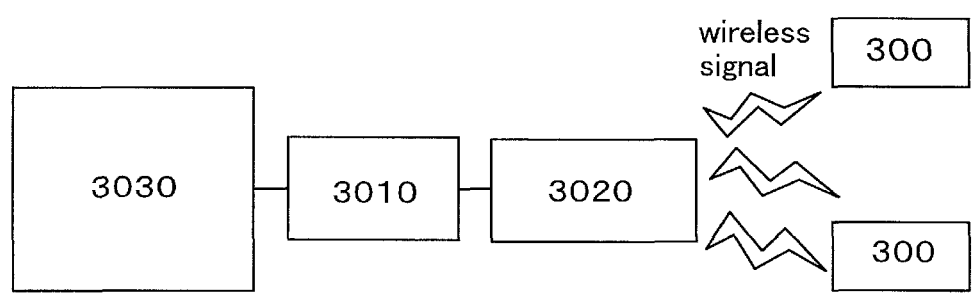
FIG. 9 is a view of a wireless communication system in an embodiment of the invention.

A schematic view of a wireless communication system is illustrated in FIG. 9. The wireless communication system mainly includes a communication device 3010, an antenna unit 3020 which is electrically connected to the communication device 3010, an RFID tag 300, and a controlling terminal 3030 which controls the communication device.

Figure 2:
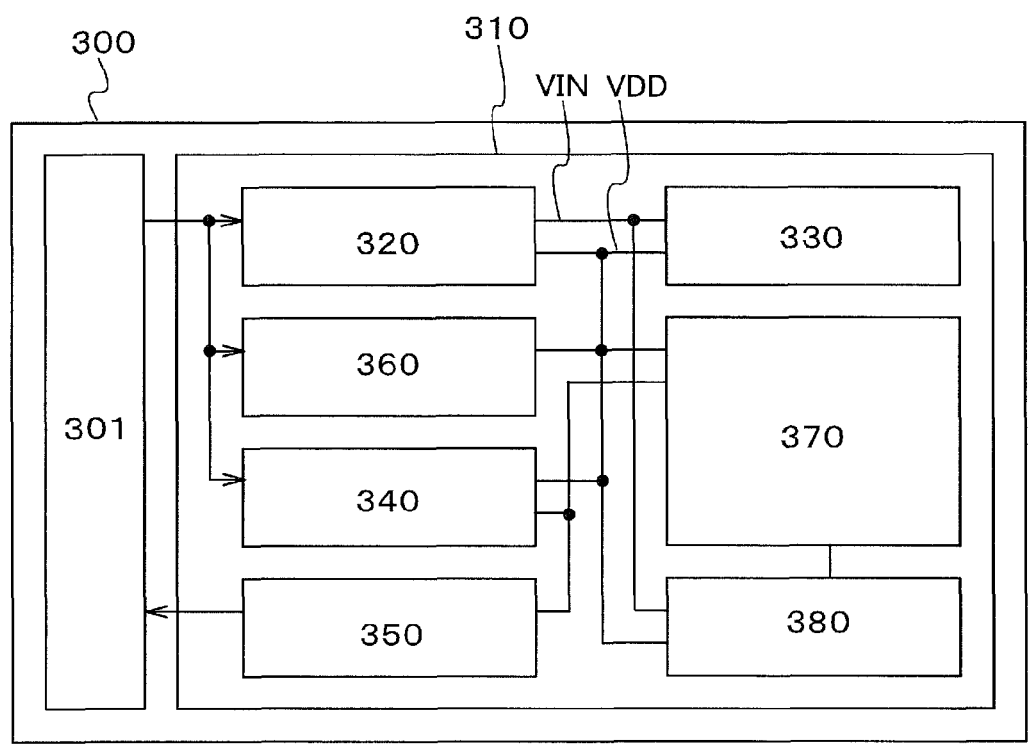
FIG. 2 is a block diagram illustrating an RFID tag in an embodiment of the invention.

A circuit configuration of the RFID tag 300 is illustrated in FIG. 2. The RFID tag 300 includes an antenna 301 and the semiconductor integrated circuit 310. Although not illustrated, the antenna 301 may be provided in the semiconductor integrated circuit 310 or may be provided outside the semiconductor integrated circuit 310 as illustrated in FIG. 2. The semiconductor integrated circuit 310 includes the input circuit 320, the circuit 330 which generates a constant voltage, the control circuit 370, and the memory 380 which are components of a semiconductor device of one embodiment of the present invention. Specific examples of a structure of the memory 380 are illustrated in FIG. 3 and the like.

Next, operation will be described with reference to FIG. 2 and FIG. 9.

Data is transmitted to the RFID tag 300 from the antenna unit 3020 which is electrically connected to the communication device 3010. The transmitted data includes information or the like from the communication device 3010 to the RFID tag 300. Then, the transmitted data is received by the antenna 301 included in the RFID tag 300.

The data received by the antenna 301 is transmitted as an AC signal, which is an electrical signal, to the input circuit 320. The input circuit 320 includes a rectifier circuit and a capacitor. The signal which is the received data is rectified by passing through the rectifier circuit and then smoothed by the capacitor. Then, a DC voltage (hereinafter referred to as VIN) is generated.

As for the configuration of the rectifier circuit, any circuit configuration can be employed as long as the circuit rectifies an input signal to generate a DC voltage. For example, a circuit configuration is given in which a rectifier circuit such as a half-wave rectifier circuit or a full-wave rectifier circuit is combined with an element such as a capacitor or a coil.

Although the capacitor is used when the VIN is generated, a coil or both of a coil and the capacitor may be used. A configuration may be anything as long as the circuit can generate a DC voltage from a rectified signal.

The VIN is transmitted to the circuit 330 which generates a constant voltage, and a constant voltage (hereinafter referred to as VDD) is generated. The circuit 330 generates a constant voltage which is lower than or equal to a DC voltage (hereinafter referred to as VIN) generated by the input circuit 320. As for the configuration of the circuit 330, any circuit configuration can be employed as long as the circuit can keep a voltage constant which is generated by using either or both of a voltage and/or a current. For example, a regulator is given.

The VDD generated by the circuit 330 which generates a constant voltage is supplied to each circuit. Note that each circuit has the low power supply potential (VSS) in common.

In the case where a voltage generated by the input circuit 320 is small, the circuit 330 which generates a constant voltage is not necessarily provided. In that case, the VIN generated by the input circuit 320 is supplied to each circuit. Note that each circuit has the low power supply potential (VSS) in common.

In addition, the data received by the antenna 301 is also transmitted as the AC signal to a demodulation circuit 340. The demodulation circuit 340 is formed using a rectifier circuit, a resistor, a capacitor, and the like. Then, the received data is rectified and demodulated. A signal demodulated is referred to as a demodulated signal.

As for the configuration of the rectifier circuit, any circuit configuration can be employed as long as the circuit rectifies an input signal to generate a DC voltage. For example, a circuit configuration is given in which a rectifier circuit such as a half-wave rectifier circuit or a full-wave rectifier circuit is combined with an element such as a capacitor or a coil.

The resistor and the capacitor are utilized so as to demodulate a signal which has passed through the rectifier circuit. The resistor and the capacitor may be connected in various ways as long as a signal which has passed through the rectifier circuit is demodulated. For example, there is a structure in which a resistor and capacitors are connected to each other to be a n-type.

The demodulated signal may be amplified by providing an analog amplifier next to the demodulation circuit 340. By amplifying the demodulated signal, a signal waveform is shaped. When a signal waveform becomes dull, there is the case where the delay of a signal between each circuit is large and operation becomes unstable. However, when a signal waveform is shaped, the delay of a signal between each circuit is small and operation becomes stable.

Further, the data received by the antenna 301 is also transmitted as the AC signal to a clock generation circuit 360. The clock generation circuit 360 divides the AC signal and generates a reference clock signal. The reference clock signal generated in the clock generation circuit 360 is transmitted to each circuit, which is used for latching and selecting the signal in each circuit, counting time, or the like. Although not illustrated, the demodulated signal may be supplied to the clock generation circuit.

The demodulated signal and the reference clock signal are transmitted to the control circuit 370. In the control circuit 370, data transmitted to the RFID tag 300 is extracted from the demodulated signal. In addition, the control circuit 370 determines the data which has been transmitted to the RFID tag 300 from the demodulated signal. Further, the control circuit 370 generates a signal used to control each circuit.

Then, the control circuit 370 determines the data which has been transmitted from the communication device 3010.

In the case where data including an instruction in which data transmitted from the communication device 3010 is written to the memory 380 is transmitted from the communication device 3010 to the RFID tag 300 using a semiconductor device of one embodiment of the present invention, the data transmitted from the communication device 3010 is written to the memory 380. Specifically, the RFID tag 300 operates in accordance with contents in which the data transmitted from the communication device 3010 is determined by the control circuit 370, and for example, information is written to an information sector, and data for preventing additional writing is written to a sector for preventing additional writing.

In the case where the control circuit 370 determines that an instruction in which information is written to the information sector is included in the data transmitted from the communication device 3010, information included in the data transmitted from the communication device 3010 is written to the information sector from the control circuit 370.

In the case where the memory 380 has such a structure as illustrated in FIG. 3, when information is written to the information sector, data for preventing additional writing is written from the control circuit 370 to the sector for preventing additional writing which is electrically connected to the information sector to which writing is performed. When data is written to and held in the sector for preventing additional writing, this semiconductor device changes from an initial state before data including a write instruction is received to a state after the data including a write instruction is received and data is written to the sector for preventing additional writing, that is, a state that additional writing is impossible.

Note that in the case where data including an instruction in which data held in the memory 380 included in the RFID tag 300 using a semiconductor device of one embodiment of the present invention is read is transmitted from the communication device 3010, the RFID tag 300 transmits data (information or the like held in the information sector) held in the memory 380 or the written data including unique data such as an ID number to the communication device 3010.

Further, the control circuit 370 also has a role of converting the data including unique data such as an ID number, which is held or written in the memory 380, into a signal encoded by an encoding method which conforms to a standard such as an ISO standard or the like. In accordance with the encoded signal, the signal which is data received by the antenna 301 is modulated by a modulation circuit 350.

The modulated data is received by the antenna unit 3020 which is electrically connected to the communication device 3010. Then, the received data is analyzed in the communication device 3010 to recognize the unique data such as the ID number in the RFID tag 300 using the semiconductor device of one embodiment of the present invention.

The memory 380 is a memory to which writing can be performed only once such as an OTP memory or a write-once memory. Any memory can be used as long as writing can be performed to the memory only once.

The memory 380 may have a memory where only reading is possible such as MROM in addition to the memory to which writing can be performed only once such as an OTP memory or a write-once memory.

As described above, the RFID tag having a semiconductor device of one embodiment of the present invention has at least two states. That is, after the data including a write instruction to the memory is received and the data transmitted from the communication device 3010 is written to the memory, the semiconductor device changes from a state before data for preventing additional writing is written to the memory to a state of preventing additional writing; therefore, additional writing is not performed even when data including a write instruction is received. Thus, an RFID tag which prevents miswriting and tampering of data without change of data which has been written to the memory once can be provided.

This embodiment can be combined with any of the other embodiments, as appropriate.

Embodiment 4

In this embodiment, more detailed operation of a semiconductor device of one embodiment of the present invention when it is provided for an RFID tag will be described.

A schematic view of a wireless communication system is illustrated in FIG. 9. In addition, an example of a flowchart of operation of an RFID tag using a semiconductor device of one embodiment of the present invention is illustrated in FIG. 10.

Figure 10:
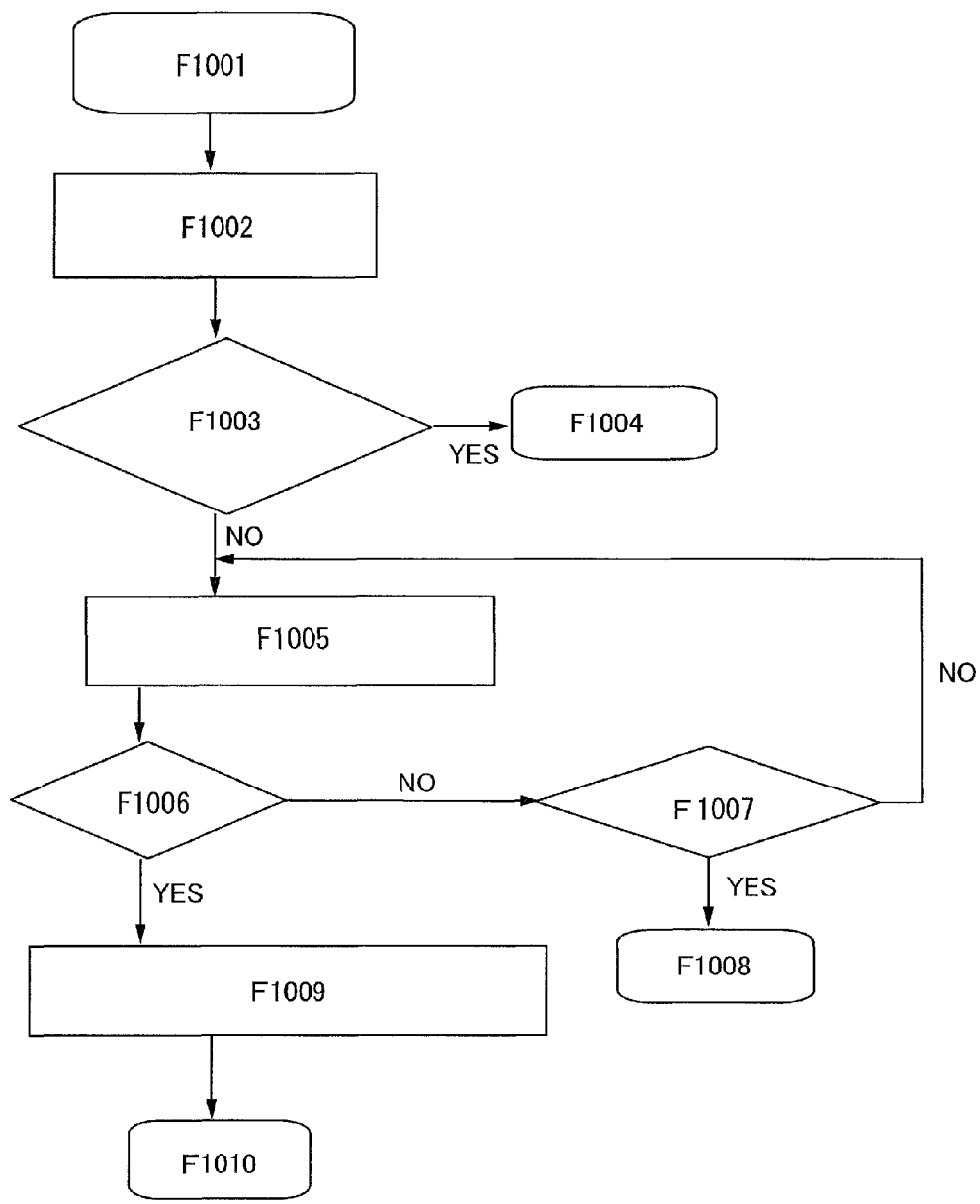
FIG. 10 is a flowchart illustrating an operation of a semiconductor device in an embodiment of the invention.

Note that the flowchart of FIG. 10 is the example of operation of the RFID tag using a semiconductor device of one embodiment of the present invention, and one embodiment of the present invention is not limited to this operation (flow). Between each operation (flow), operation (flow) which is not illustrated in FIG. 10 may be added.

The memory to which writing can be performed only once such as an OTP memory or a write-once memory, which is included in the RFID tag using a semiconductor device of one embodiment of the present invention is formed using a decoder used to control operation of memory cells in a word direction, a decoder used to control operation of the memory cells in a bit direction, and a memory cell array in which the plurality of memory cells is arranged regularly.

Note that the memory to which writing can be performed only once such as an OTP memory or a write-once memory, which is included in the RFID tag using a semiconductor device of one embodiment of the present invention may include a pre-charge circuit.

The pre-charge circuit is a circuit which raises a potential of a bit line to a given potential in advance before data in the memory cells is read or data is written to the memory cells. When the pre-charge circuit is mounted, a load can be reduced when the decoder operates at the time of reading or writing, and read time or write time can be shortened.

The memory cell array in which the plurality of memory cells is arranged regularly includes at least an information sector to which a user can write information freely. The memory cell array may also have a sector for determining whether writing is possible or a sector for preventing additional writing.

That is, one memory may include a plurality of sectors performing specific functions. Specifically, the memory may have a structure including an information sector and a sector for preventing additional writing, a structure including an information sector, a sector for preventing additional writing, and a sector for determining whether writing is possible, or a structure including a sector performing another function.

A plurality of memories which holds their respective specific information or data may be provided. For example, the memory has a plurality of memories such as a memory (information memory) which holds information of the information sector, a memory (memory for determining whether writing is possible) which holds data for determining whether writing is possible, and a memory (memory for preventing additional writing) which holds data for preventing additional writing in some cases. The information memory, the memory for determining whether writing is possible, and the memory for preventing additional writing may be electrically connected to one another. A structure in which a memory for determining whether writing is possible is not provided may be used. That is, a structure in which only the information memory and the memory for preventing additional writing are provided may be used.

In this embodiment, operation of one memory having the information sector and the sector for preventing additional writing is described. An example of a flowchart of operation of an RFID tag using a semiconductor device of one embodiment of the present invention is described with reference to FIG. 10 below.

First, data including an instruction in which data transmitted from the communication device 3010 is written to the memory 380 is transmitted from the communication device 3010 to the RFID tag 300 using a semiconductor device of one embodiment of the present invention.

The RFID tag 300 receives the data transmitted from the communication device 3010 (A write instruction is received: F1001). Then, the received data is input to the control circuit from an input circuit. The control circuit holds the received data. The control circuit analyzes the received data and recognizes it as information or data for preventing additional writing.

To check whether data for preventing additional writing is written to the sector for preventing additional writing, the control circuit checks whether data is written by reading the sector for preventing additional writing (Data of the sector for preventing additional writing is read: F1002).

Next, the control circuit determines whether data for preventing additional writing is written to the sector for preventing additional writing of the memory in the RFID tag 300 (Is data written to the sector for preventing additional writing?: F1003).

In the case where data is written to the sector for preventing additional writing, the RFID tag 300 transmits an error code in which writing is impossible to the communication device 3010 (Error code transmission: F1004). That is, the RFID tag 300 transmits the error code in accordance with a standard, a specification, or the like to the communication device 3010.

In the case where data for preventing additional writing is not written to the sector for preventing additional writing, information transmitted from the communication device 3010 is input to the information sector in the memory from the control circuit 370, and the information sector holds the transmitted information (Information is written to the information sector: F1005).

It is checked whether information included in the data transmitted from the communication device 3010 is accurately written to the information sector in the memory (Does information correspond to?: F1006). The control circuit reads the information written to the information sector. The control circuit checks whether accurate writing is performed by comparing the information read from the information sector with the information included in the data transmitted from the communication device 3010.

As a result of comparing the information read from the information sector with the information included in the data transmitted from the communication device 3010, if it can be checked that these correspond to each other, it can be checked that the information included in the transmitted data is accurately written to the information sector, which results in moving to the next operation. However, in the case where it cannot be checked that these correspond to each other, operation from F1005 in FIG. 10 is repeated and rewriting is performed. In addition to this, the number of trials of rewriting is determined (How many trials preceded before this trial? (Is this the n-th trial?) (n≥1): F1007). The number of trials of rewriting may be set in consideration of a standard, a specification, or the like.

In the case where rewriting of the number of trials which are set fails, the information read from the memory does not correspond to the information included in the data transmitted from the communication device 3010, so that the information written to the information sector is not written accurately. Therefore, the control circuit determines that writing is impossible and outputs an error code. The RFID tag 300 transmits the error code to the communication device 3010 (Error code transmission: F1008). That is, the RFID tag 300 transmits the error code in accordance with a standard, a specification, or the like to the communication device 3010.

As a result of comparing the information read from the information sector with the information included in the data transmitted from the communication device 3010, if it can be checked that these correspond to each other, data for preventing additional writing is input to the sector for preventing additional writing from the control circuit (Data is written to the sector for preventing additional writing: F1009). The data for preventing additional writing is held in the sector for preventing additional writing. When the data for preventing additional writing is held in the sector for preventing additional writing, the RFID tag 300 changes from the state in which writing is possible to the state in which additional writing is impossible.

Then, the RFID tag 300 terminates writing of the data transmitted from the communication device 3010 to the memory (Writing termination: F1010).

The data for preventing additional writing is held in the sector for preventing additional writing, so that writing to a corresponding word or bit in the sector for preventing additional writing is prohibited. Alternatively, writing to the information sector electrically connected to the sector for preventing additional writing is prohibited (the information held in the information sector can be read). Alternatively, writing to the RFID tag provided with a semiconductor device of one embodiment of the present invention becomes impossible at the stage in which writing to all the memory cells is terminated. That is, when writing to the memory is performed once, data for preventing additional writing is held in the sector for preventing additional writing; therefore, the semiconductor device of one embodiment of the present invention changes to another state. Therefore, even when data as an instruction in which information is written is transmitted again from the communication device, additional writing is impossible.

As described above, the RFID tag having a semiconductor device of one embodiment of the present invention can provide an RFID tag which prevents miswriting and tampering of data without change of data which has been written to the memory once.

The example in which data for preventing additional writing is included in the data transmitted from the communication device 3010 is described. However, there is no particular limitation, and data for preventing additional writing is not necessarily included in the data transmitted from the communication device 3010. In that case, data which shows that information is written to the information sector from the control circuit is written to the sector for preventing additional writing.

Note that the case where one memory includes the information sector and the sector for preventing additional writing is described; however, one embodiment of the present invention is not particularly limited to the structure in which only one for each of various sectors is provided. For example, as illustrated in FIG. 5 and FIG. 6, a structure in which the plurality of information sectors (381*a* and 381*b*) is provided and the plurality of sectors for preventing additional writing (382*a* and 382*b*) which is electrically connected to their respective information sectors is provided may be used, and there is no particular limitation on the structures of sectors. In this case, the information sectors which are electrically connected to the sectors for preventing additional writing can be prevented from miswriting and tampering of data without change of data which has been written to the memory.

This embodiment can be combined with any of the other embodiments, as appropriate.

Embodiment 5

In this embodiment, more detailed operation of a semiconductor device of one embodiment of the present invention when it is provided for an RFID tag will be described.

A schematic view of a wireless communication system is illustrated in FIG. 9. In addition, an example of a flowchart of operation of an RFID tag using a semiconductor device of one embodiment of the present invention is illustrated in FIG. 11.

Figure 11:
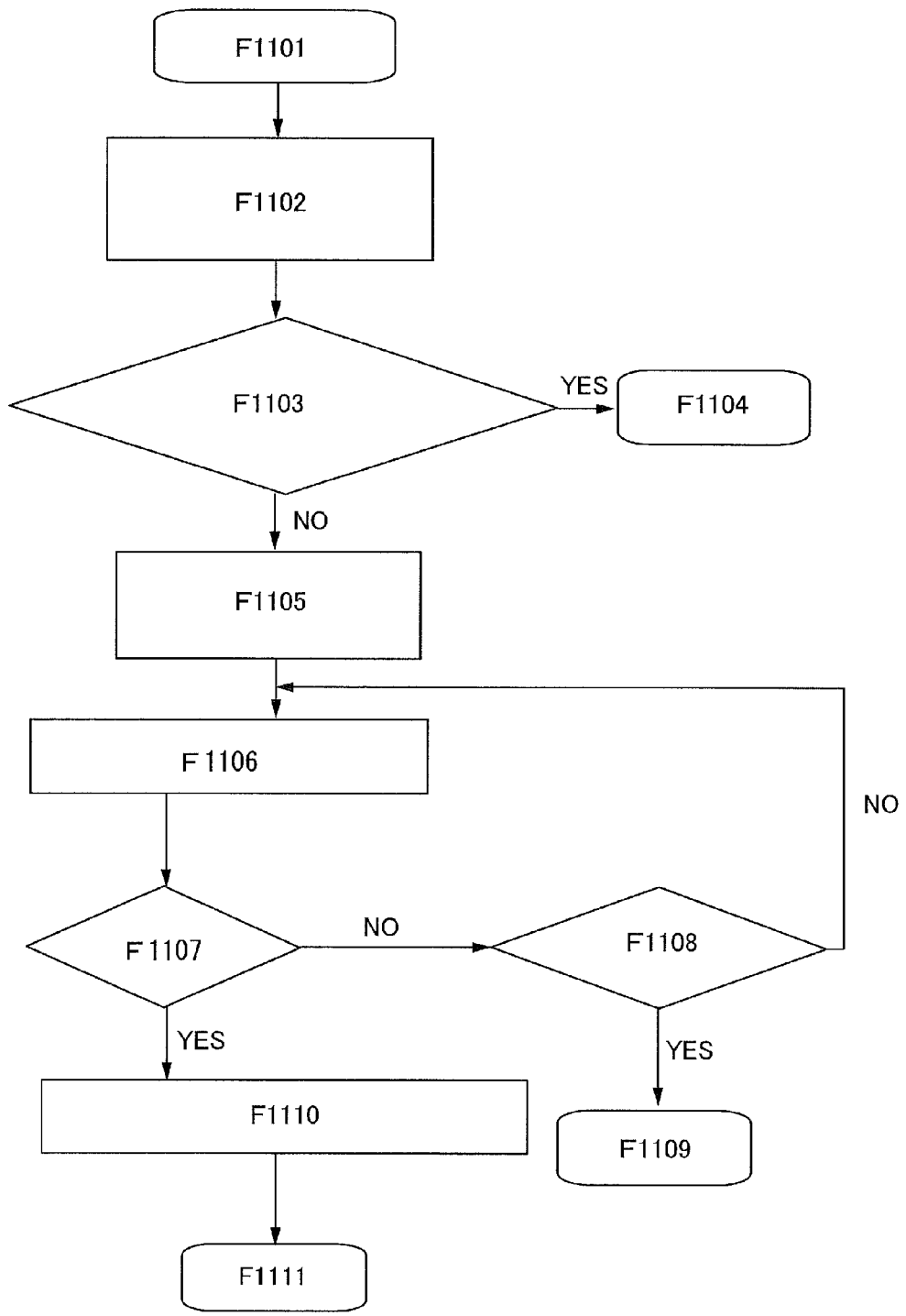
FIG. 11 is a flowchart illustrating an operation of a semiconductor device in an embodiment of the invention.

Note that the flowchart of FIG. 11 is the example of operation of the RFID tag using a semiconductor device of one embodiment of the present invention, and one embodiment of the present invention is not limited to this operation (flow). Between each operation (flow), operation (flow) which is not illustrated in FIG. 11 may be added.

The memory to which writing can be performed only once such as an OTP memory or a write-once memory, which is included in the RFID tag using a semiconductor device of one embodiment of the present invention is formed using a decoder used to control operation of memory cells in a word direction, a decoder used to control operation of the memory cells in a bit direction, and a memory cell array in which the plurality of memory cells is arranged regularly.

Note that the memory to which writing can be performed only once such as an OTP memory or a write-once memory, which is included in the RFID tag using a semiconductor device of one embodiment of the present invention may include a pre-charge circuit.

The pre-charge circuit is a circuit which raises a potential of a bit line to a given potential in advance before data in the memory cells is read or data is written to the memory cells. When the pre-charge circuit is mounted, a load can be reduced when the decoder operates at the time of reading or writing, and read time or write time can be shortened.

The memory cell array in which the plurality of memory cells is arranged regularly includes at least an information sector to which a user can write information freely. The memory cell array may also have a sector for determining whether writing is possible or a sector for preventing additional writing. That is, one memory may include a plurality of sectors performing specific functions. Specifically, the memory may have a structure including an information sector and a sector for preventing additional writing, a structure including an information sector, a sector for preventing additional writing, and a sector for determining whether writing is possible, or a structure including a sector performing another function.

Figure 12:
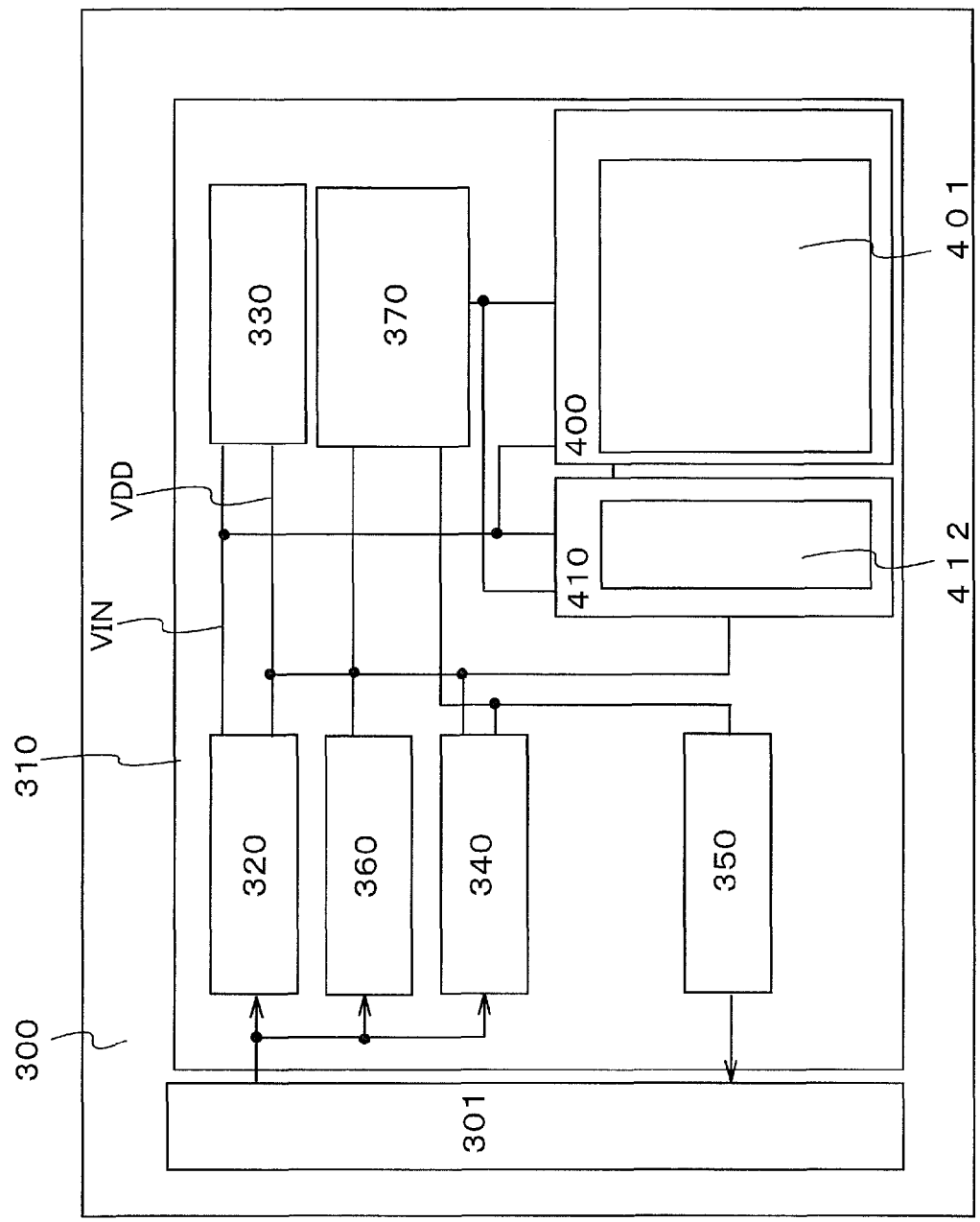
FIG. 12 is a block diagram illustrating an RFID tag in an embodiment of the invention.
Figure 13:
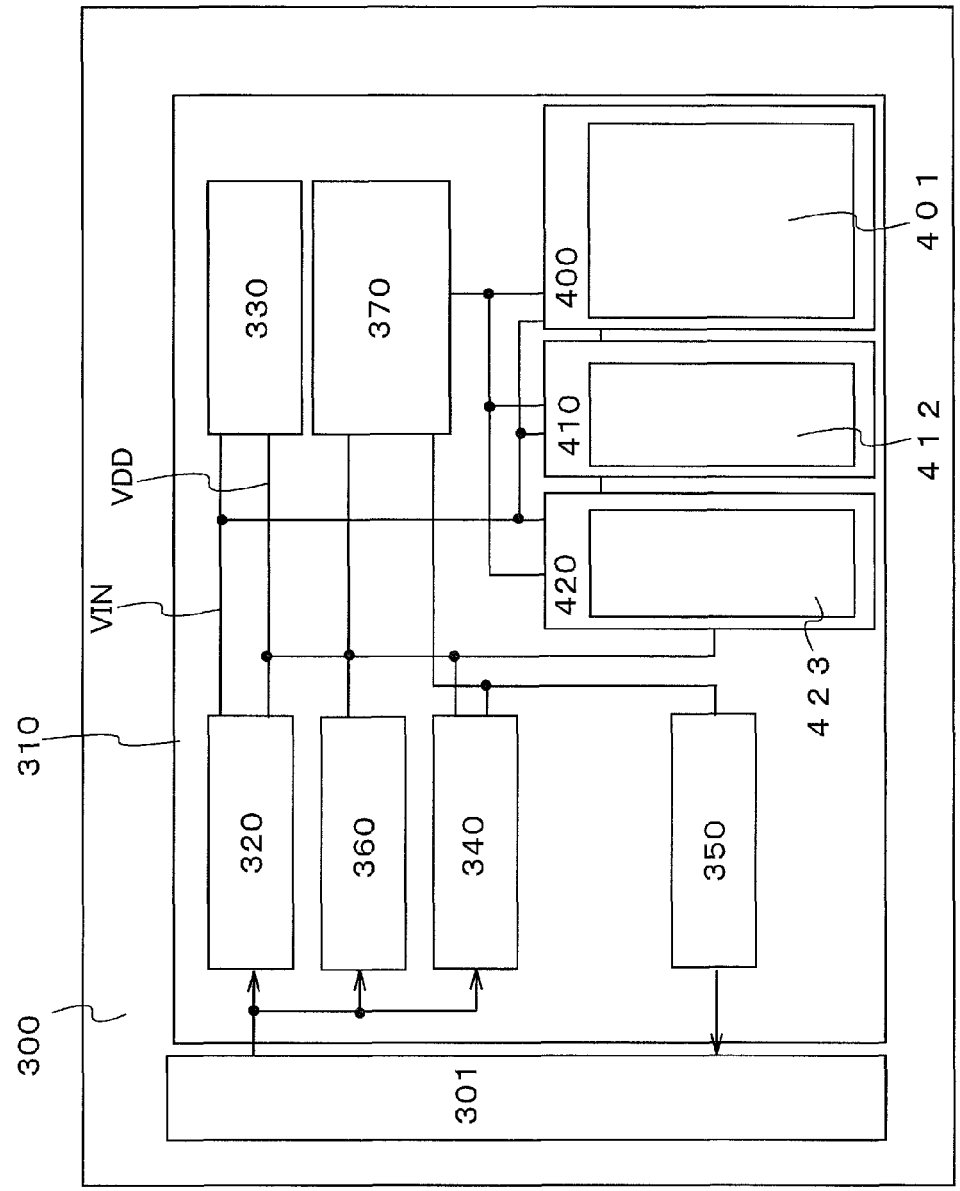
FIG. 13 is a block diagram illustrating an RFID tag in an embodiment of the invention.

A plurality of memories which holds their respective specific information or data may be provided. For example, as illustrated in FIG. 12 and FIG. 13, a memory has a plurality of memories such as a memory 400 (information memory) which holds information of an information sector 401, a memory 410 (memory for preventing additional writing) which holds data of a sector for preventing additional writing 412, and a memory 420 (memory for determining whether writing is possible) which holds data of a sector for determining whether writing is possible 423 in some cases. The information memory 400, the memory 410 for preventing additional writing, and the memory 420 for determining whether writing is possible may be electrically connected to one another.

In this embodiment, operation of one memory having an information sector, a sector for preventing additional writing, and a sector for determining whether writing is possible is described. An example of a flowchart of operation of an RFID tag using a semiconductor device of one embodiment of the present invention is described with reference to FIG. 11.

First, data including an instruction in which data transmitted from the communication device 3010 is written to the memory 380 is transmitted from the communication device 3010 to the RFID tag 300 using a semiconductor device of one embodiment of the present invention.

The RFID tag 300 receives the data transmitted from the communication device 3010 (A write instruction is received: F1101). Then, the received data is input to the control circuit from an input circuit. The control circuit holds the received data.

To check whether data for determining whether writing is possible and data for preventing additional writing are written to the sector for determining whether writing is possible and the sector for preventing additional writing, respectively, the control circuit reads the sector for determining whether writing is possible and the sector for preventing additional writing, and checks whether data for determining whether writing is possible and data for preventing additional writing are written (Data of the sector for determining whether writing is possible and data of the sector for preventing additional writing are read: F1102).

Note that by the control circuit, the sector for determining whether writing is possible and the sector for preventing additional writing are read and checked whether data is written to the sectors; however, there is no particular limitation. As a method for checking whether data is written to the information sector and the like (sectors except the sector for determining whether writing is possible and the sector for preventing additional writing) which are electrically connected to the sector for determining whether writing is possible and the sector for preventing additional writing, a method may be used by which the control circuit reads data or information from the information sector and the like which are electrically connected to the sector for determining whether writing is possible and the sector for preventing additional writing, and checks whether the data or the information is written to the information sector and the like which are electrically connected to the sector for determining whether writing is possible and the sector for preventing additional writing.

Next, the control circuit determines whether data for determining whether writing is possible and data for preventing additional writing are written to the sector for determining whether writing is possible and the sector for preventing additional writing, respectively, of the memory in the RFID tag 300 (Is data written to the sector for determining whether writing is possible and the sector for preventing additional writing?: F1103).

In the case where data for determining whether writing is possible and data for preventing additional writing are written to the sector for determining whether writing is possible and the sector for preventing additional writing, respectively, the control circuit determines that writing is impossible and outputs an error code. The RFID tag 300 transmits the error code to the communication device 3010 (Error code transmission: F1104). That is, the RFID tag 300 transmits the error code in accordance with a standard, a specification, or the like to the communication device 3010.

In the case where data for determining whether writing is possible and data for preventing additional writing are not written to the sector for determining whether writing is possible and the sector for preventing additional writing, respectively, data for determining whether writing is possible is input from the control circuit to the sector for determining whether writing is possible, and the sector for determining whether writing is possible holds the data for determining whether writing is possible (Data is written to the sector for determining whether writing is possible: F1105). When data for determining whether writing is possible is held in the sector for determining whether writing is possible, the control circuit determines that power is sufficiently input for writing to a word line or bit line which is electrically connected to the sector for determining whether writing is possible which holds the data, and writing is possible to the information sector which is electrically connected to the sector for determining whether writing is possible.

Next, information transmitted from the communication device 3010 is input from the control circuit 370 to the information sector of the memory (Information is written to the information sector: F1106). The information sector holds the information transmitted from the communication device 3010.

It is checked whether information included in the data transmitted from the communication device 3010 is accurately written to the information sector in the memory (Does information correspond to?: F1107). The control circuit reads the information written to the information sector. The control circuit checks whether accurate writing is performed by comparing the information read from the information sector with the information included in the data transmitted from the communication device 3010.

As a result of comparing the information read from the information sector with the information included in the data transmitted from the communication device 3010, if it can be checked that these correspond to each other, it can be checked that the information included in the transmitted data is accurately written to the information sector, which results in moving to the next operation. However, in the case where it cannot be checked that these correspond to each other, operation from F1106 in FIG. 11 is repeated and rewriting is performed. In addition to this, the number of trials of rewriting is determined (How many trials preceded before this trial? (Is this the n-th trial?) (n≥1): F1108). The number of trials of rewriting may be set in consideration of a standard, a specification, or the like.

In the case where rewriting of the number of trials which are set fails, the information read from the information sector does not correspond to the information included in the data which is transmitted from the communication device 3010 and held in the control circuit, so that the information is not written accurately. Therefore, an error code in which writing is impossible is transmitted to the communication device 3010 (Error code transmission: F1109). That is, the RFID tag 300 transmits the error code in accordance with a standard, a specification, or the like to the communication device 3010.

As a result of comparing the information read from the information sector with the information included in the data which is transmitted from the communication device 3010 and held in the control circuit, if it can be checked that these correspond to each other, data for preventing additional writing is input to the sector for preventing additional writing from the control circuit (Data is written to the sector for preventing additional writing: F1110). When the data for preventing additional writing is held in the sector for preventing additional writing, the RFID tag 300 changes from the state in which writing is possible to the state in which additional writing is impossible.

Then, the RFID tag 300 terminates writing of the data transmitted from the communication device 3010 to the memory (Writing termination: F1111).

The data for preventing additional writing is held in the sector for preventing additional writing, so that writing to a corresponding word or bit in the sector for preventing additional writing is prohibited (the information held in the information sector can be read). Alternatively, writing to the information sector electrically connected to the sector for preventing additional writing is prohibited. Alternatively, writing to the RFID tag provided with a semiconductor device of one embodiment of the present invention becomes impossible at the stage in which writing to all the memory cells is terminated. That is, when writing to the memory is performed once, data for preventing additional writing is held in the sector for preventing additional writing; therefore, even when data as an instruction in which data is written is transmitted again from the communication device, additional writing to the memory is impossible.

As described above, the RFID tag having a semiconductor device of one embodiment of the present invention can provide an RFID tag which prevents miswriting and tampering of data without change of data which has been written to the memory once.

The example in which data for determining whether writing is possible and data for preventing additional writing are included in the data transmitted from the communication device 3010 is described. However, there is no particular limitation, and data for determining whether writing is possible and data for preventing additional writing are not necessarily included in the data transmitted from the communication device 3010. In that case, data which shows that information is written to the information sector from the control circuit is written to the sector for preventing additional writing.

The structure in which the sector for determining whether writing is possible, the sector for preventing additional writing, and the information sector are provided in one memory is described; however, one embodiment of the present invention is not particularly limited to the structure in which only one for each of various sectors is provided. For example, as illustrated in FIG. 6, a structure in which the plurality of information sectors (381*a* and 381*b*) is provided, and the plurality of sectors for preventing additional writing (382*a* and 382*b*) which are electrically connected to respective information sectors and the plurality of sectors for determining whether writing is possible (383*a* and 383*b*) which are electrically connected to respective information sectors are provided may be used, and there is no particular limitation on the structure of the sectors. In this case, the information sectors which are electrically connected to the sectors for determining whether writing is possible and the sectors for preventing additional writing can be prevented from miswriting and tampering of data without change of data which has been written to the memory once.

The sector for determining whether writing is possible and the sector for preventing additional writing are preferably provided for each one bit ideally. However, in the case where the sector for determining whether writing is possible and the sector for preventing additional writing are provided for each one bit, it is necessary to provide at least one or more memories having the same capacity. Then, the area of the memory and the area of an RFID tag itself increase, which causes adverse effects such as a small number of RFID tags per one substrate. Therefore, the sector for determining whether writing is possible is provided for each word line or each bit line in many cases because of fraction defective of the memory cell, a necessary redundant function, or the like.

Further, the sector for determining whether writing is possible 383 is provided, so that it can be checked whether information is written to the information sector 381 electrically connected to the sector for determining whether writing is possible 383. At the time of writing from the control circuit 370 to the information sector 381 electrically connected to the sector for determining whether writing is possible 383, correct information can be accurately written, occurrence of causing defects such as writing defects is reduced, and reliability of wireless communication between the RFID tag and the communication device or the like is improved.

This embodiment can be combined with any of the other embodiments, as appropriate.

Embodiment 6

In this embodiment, a method for manufacturing a semiconductor device including a semiconductor storage device provided with an anti-fuse type OTP memory will be described with reference to FIGS. 14A to 14E, FIGS. 15A to 15E, FIGS. 16A to 16E, FIGS. 17A to 17C, and FIGS. 18A to 18D. One embodiment of manufacturing a semiconductor device, in which a logic circuit portion 1550, a semiconductor memory circuit portion 1552, and an antenna portion 1554 are provided over the same substrate, is described here. Circuits including thin film transistors are integrated in the logic circuit portion 1550. The semiconductor memory circuit portion 1552 includes a memory cell including a plurality of thin film transistors and an anti-fuse type memory element. Note that for convenience, cross sectional views illustrating two thin film transistors included in the logic circuit portion 1550, one thin film transistor and one memory element which are included in the semiconductor memory circuit portion 1552, and one capacitor and one thin film transistor included in the antenna portion 1554 are illustrated in the drawings. Note that each element illustrated in the cross-sectional views in this embodiment may be illustrated with an exaggerated scale in order to describe the cross-sectional structures clearly.

Note that a semiconductor device refers to all devices that can function by utilizing semiconductor characteristics.

First, a separation layer 1502 is formed over a support substrate 1501. A glass substrate is used as the support substrate 1501. The separation layer 1502 has a stacked-layer structure of, for example, a metal layer and a metal oxide layer in this embodiment. As the metal layer, a tungsten layer, a tungsten nitride layer, or a molybdenum layer with a thickness of 30 nm to 200 nm which is fabricated by a sputtering method is used. As the metal oxide layer, a layer formed using tungsten oxide, molybdenum oxide, titanium oxide, tantalum oxide, or cobalt oxide may be used. Alternatively, only a metal film may be used.

Next, a surface of the separation layer 1502 is oxidized to form a metal oxide layer. The metal oxide layer may be formed by oxidation of the surface of the separation layer 1502 with pure water or ozone water, or oxidation of the surface of the separation layer 1502 with oxygen plasma. Alternatively, the metal oxide layer may be formed by heating in an atmosphere containing oxygen. Further alternatively, the metal oxide layer may be formed in a later step of forming an insulating layer which is formed over the separation layer 1502. For example, when a silicon oxide layer or a silicon oxynitride layer is formed as the insulating layer by a plasma enhanced CVD method, the surface of the separation layer 1502 is oxidized, so that the metal oxide layer is formed. Note that the metal oxide layer is not illustrated in the drawing. Further, a base insulating layer such as a silicon oxide layer or a silicon nitride layer may be provided between the separation layer 1502 and the substrate. In a stacked-layer structure of this embodiment, a silicon oxynitride layer with a thickness of 100 nm is used as the base insulating layer, a tungsten layer with a thickness of 30 nm is used as the metal layer, and a silicon oxide layer with a thickness of 200 nm is used as the first insulating layer (FIG. 14A).

Then, a first insulating layer 1503 is formed over the separation layer 1502. An insulating layer such as a silicon oxide layer, a silicon nitride layer, or a silicon oxynitride layer is formed as the first insulating layer 1503. As an example of the first insulating layer 1503, a two-layer structure can be given in which a silicon nitride oxide layer having a thickness of 50 nm to 100 nm which is formed by a plasma enhanced CVD method using $SiH_4$, $NH_3$, and $N_2O$ as reactive gases, and a silicon oxynitride layer having a thickness of 100 nm to 150 nm which is formed by a plasma enhanced CVD method using $SiH_4$ and $N_2O$ as reactive gases are stacked. In the case where the first insulating layer 1503 has a stacked-layer structure, as at least one layer of the first insulating layer 1503, a silicon nitride layer or a silicon oxynitride layer having a thickness of 10 nm or less is preferably formed. Alternatively, a three-layer structure may be employed in which a silicon nitride oxide layer, a silicon oxynitride layer, and a silicon nitride layer are sequentially stacked. Although the first insulating layer 1503 serves as a base insulating layer, it is not provided if it is not particularly needed. In this embodiment, a stacked-layer structure of a 50-nm-thick silicon nitride oxide layer and a 100-nm-thick silicon oxynitride layer is used as the first insulating layer (FIG. 14B).

Next, a semiconductor layer 1570 is formed over the first insulating layer 1503. The semiconductor layer 1570 is formed as follows: a semiconductor layer having an amorphous structure is formed by a CVD method such as an LPCVD method or a plasma enhanced CVD method, or a sputtering method, and then crystallized to obtain a crystalline semiconductor layer, and the crystalline semiconductor layer is selectively etched into a desired shape. As a crystallization method, a laser crystallization method, a thermal crystallization method using RTA or an annealing furnace, a crystallization method using a metal element, such as nickel, which promotes crystallization, or the like can be used. Note that when the semiconductor layer is formed by a plasma enhanced CVD method, the first insulating layer 1503 and the semiconductor layer having an amorphous structure can be successively formed without exposure to air. The semiconductor layer is formed to a thickness of 25 nm to 80 nm (preferably 30 nm to 70 nm). Although there is no particular limitation on a material of the semiconductor layer, silicon, silicon germanium, or the like is preferably used.

Alternatively, for crystallization treatment of the semiconductor layer having an amorphous structure, a continuous wave laser can be used. In order to obtain a crystal with a large grain size in crystallization of the semiconductor layer having an amorphous structure, it is preferable to employ second to fourth harmonics of a solid laser capable of continuous wave oscillation. Typically, a second harmonic (532 nm) or a third harmonic (355 nm) of an Nd: $YVO_4$ laser (a fundamental wave of 1064 nm) may be applied. In the case of using the continuous wave laser, a laser beam emitted from a continuous wave $YVO_4$ laser having an output of 10 W is converted into a harmonics by a non-linear optical element. Alternatively, there is a method in which $YVO_4$ crystal and a non-linear optical element are put in a resonator and a harmonic is emitted. It is preferable to shape the laser beam into a rectangular or elliptical laser beam on an irradiation surface by an optical system and then deliver the laser beam to an object. At this time, an energy density of approximately 0.01 $MW/cm^2$ to 100 $MW/cm^2$ (preferably, 0.1 $MW/cm^2$ to 10 $MW/cm^2$) is needed. Then, the semiconductor layer may be moved at a speed of approximately 10 cm/sec to 2000 cm/sec relatively to the laser beam so as to be irradiated. In this embodiment, amorphous silicon with a thickness of 66 nm is stacked over the first insulating layer and is irradiated with laser light to be crystallized (FIG. 14C).

Note that if necessary, a small amount of an impurity element (boron or phosphorus) is added to the semiconductor layer in order to control a threshold value of a thin film transistor to be completed later. In this embodiment, boron is added by an ion doping method in which diborane ($B_2H_6$) is excited by plasma without mass separation (FIG. 14D).

The semiconductor layer 1570 is selectively etched so that semiconductor layers 1571 to 1576 having desired shapes are formed (FIG. 14E). Further, an impurity element may be additionally added to a semiconductor layer in a region to serve as an n-channel transistor at a low concentration to form a channel formation region therein. In this embodiment, boron is added, with a semiconductor layer in a region to serve as a p-channel transistor later covered with a resist mask 1577 (FIG. 15A).

Next, the surface of each of the semiconductor layers is washed at the same time as removal of an oxide film on the surface of each of the semiconductor layers with an etchant containing hydrofluoric acid. Then, a second insulating layer 1578 which covers the semiconductor layers is formed. The second insulating layer 1578 is formed to a thickness of 1 nm to 200 nm by a CVD method or a sputtering method. Preferably, a single-layer structure or a stacked-layer structure including an insulating layer containing silicon having a thickness of 10 nm to 50 nm is formed, and then surface nitridation treatment is performed using plasma excited by a microwave. The second insulating layer 1578 serves as a gate insulating layer (GI film) of the thin film transistor to be formed later. In a stacked-layer structure of this embodiment, a silicon oxynitride layer having a thickness of 10 nm is formed as the second insulating layer 1578 (FIG. 15B).

Note that in order that the semiconductor layers (1574, 1575) in a region to become a capacitor later can function as conductors, an impurity element (boron or phosphorus) is added to the semiconductor layers at a high concentration. In this case, a region to serve as an assist capacitor in the memory cell is preferably doped with an impurity element imparting p-type conductivity. Note that the region other than the region to serve as the capacitor may be covered with resist masks 1579 to 1581 (FIG. 15C).

Next, a gate electrode 1504, a gate electrode 1505, a gate electrode 1506, a gate electrode 1507, a capacitor electrode 1508, and a first electrode 1509 serving as a lower electrode of a memory element are formed over the second insulating layer. A conductive layer having a thickness of 100 nm to 500 nm which is obtained by a sputtering method is selectively etched and processed into a desired shape, so that the gate electrodes 1504 to 1507, the capacitor electrode 1508, and the first electrode 1509 are obtained.

As a material of the gate electrodes 1504 to 1507, the capacitor electrode 1508, and the first electrode 1509, a substance such as tungsten, titanium, aluminum, nickel, chromium, molybdenum, tantalum, cobalt, zirconium, vanadium, palladium, hafnium, platinum, or iron; a single-layer structure or a stacked-layer structure of a material selected from an alloy thereof or a compound thereof can be used. A material which reacts with silicon to form a silicide is preferably used. Note that a high melting point metal is preferably used as the gate electrode of the thin film transistor. Specifically, tungsten and molybdenum can be given. In the case where the gate electrodes 1504 to 1507, the capacitor electrode 1508, and the first electrode 1509 have a stacked-layer structure, an upper material layer may be formed using the foregoing material, and a lower material layer on the gate insulating layer side may be a polysilicon layer to which an impurity element such as phosphorus is added. In addition, since the first electrode 1509 is used for an electrode used for the anti-fuse type memory element in contact with amorphous silicon, a material which is reacted with silicon is preferably used. In this embodiment, a stacked-layer structure of a 30-nm-thick tantalum nitride and a 370-nm-thick tungsten is used (FIG. 15D).

Then, resist masks 1582 to 1584 are formed so as to cover regions to be included in the p-channel transistor, the capacitor, and the memory cell. An impurity element is added to the semiconductor layers in regions to be n-channel transistors, using the gate electrodes 1505, 1506, and 1507 as masks, so that low-concentration impurity regions are formed. As the impurity element, an impurity element imparting n-type conductivity or an impurity element imparting p-type conductivity can be used. As the impurity element imparting n-type conductivity, phosphorus (P), arsenic (As), or the like can be used. In this embodiment, phosphorus is added to the semiconductor layers in the regions to be the n-channel transistors so as to be contained at concentrations of $1\times10^{15}$/cm$^3$ to $1\times10^{19}$/cm$^3$, so that n-type impurity regions are formed (FIG. 15E).

Next, the resist masks are removed, and then resist masks 1585 to 1587 are formed so as to cover the semiconductor layers in the regions to be the n-channel transistors and the regions to be a capacitor, and an impurity element is added to the semiconductor layers in the regions to be the p-channel transistors, using the gate electrode 1504 as s mask, so that p-type impurity regions are formed. As the impurity element imparting p-type conductivity, boron (B), aluminum (Al), gallium (Ga), or the like can be used. Here, boron (B) is added to the semiconductor layers in the regions to be the p-channel transistors so as to be contained at concentrations of $1\times10^{19}$/cm$^3$ to $1\times10^{20}$/cm$^3$, so that the p-type impurity region can be formed. As a result, a channel formation region 1516 and a pair of p-type impurity regions 1514 are formed in the semiconductor layer in the region to be the p-channel transistor in a self alignment manner. The p-type impurity regions 1514 serve as a source region and a drain region. In a similar manner, p-type impurity regions 1515 having different impurity concentrations are formed in the semiconductor layers in the regions to be a capacitor in a self alignment manner. In this step, the impurity is not introduced to p-type impurity regions 1517 because the capacitor electrode 1508 and the first electrode 1509 serve as masks (see FIG. 16A).

Then, sidewall insulating layers are formed on side surfaces of the gate electrodes 1504 to 1507, the capacitor electrode 1508, and the first electrode 1509. A manufacturing method of the sidewall insulating layers is as follows: first, a third insulating layer 1588 is formed to have a single-layer structure or a stacked-layer structure of a layer containing silicon, an oxide of silicon, or a nitride of silicon, or a layer containing an organic material such as an organic resin by a plasma enhanced CVD method, a sputtering method, or the like so as to cover the second insulating layer, the gate electrodes 1504 to 1507, the capacitor electrode 1508, and the first electrode 1509. In this embodiment, a stacked-layer structure of a 100-nm-thick silicon oxynitride layer and a 200-nm-thick low temperature oxide (LTO) layer is used (see FIG. 16B). Then, the third insulating layer 1588 is selectively etched by anisotropic etching in which etching is performed mainly in a perpendicular direction, whereby insulating layers (sidewall insulating layers 1510 and sidewall insulating layers 1511) are formed so as to be in contact with side surfaces of the gate electrodes 1504 to 1507, the capacitor electrode 1508, and the first electrode 1509. Note that part of the second insulating layer 1578 is removed by being etched at the same time as the formation of the sidewall insulating layers 1510. The part of the second insulating layer 1578 is removed, so that a gate insulating layer 1512 is formed under each of the gate electrodes 1504 to 1507 and the sidewall insulating layers 1510. In addition, the part of the second insulating layer is removed, so that insulating layers 1513 are formed under the capacitor electrode 1508, the first electrode 1509, and the sidewall insulating layers 1511 (FIG. 16C).

Next, resist masks 1589 to 1591 are formed so as to cover the semiconductor layers in the regions to be the p-channel transistors, and an impurity element is added to the semiconductor layers in the regions to be the n-channel transistors, using the gate electrodes 1505, 1506, and 1507 and the sidewall insulating layers 1510 as masks, so that high-concentration impurity regions are formed. The resist masks are removed after the impurity element is added. In this embodiment, phosphorus (P) is added to the semiconductor layers in the regions to be the n-channel transistors so as to be contained at concentrations of $1\times10^{19}$/cm$^3$ to $1\times10^{20}$/cm$^3$, so that n-type high-concentration impurity regions can be formed. As a result, in each of semiconductor layers in the regions to be the n-channel transistors, a channel formation region 1520, a pair of low concentration impurity regions 1519 serving as lightly doped drain (LDD) regions, and a pair of high concentration impurity regions 1518 serving as a source region and a drain region are formed in a self alignment manner. Note that the low concentration impurity regions 1519 serving as LDD regions are formed under the sidewall insulating layers 1510 (FIG. 16D).

Note that the structure is described in which the LDD regions are formed in the semiconductor layers included in the n-channel thin film transistors and the LDD regions are not formed in the semiconductor layers included in the p-channel thin film transistors, but the structure is not limited to this. The LDD regions may be formed in the semiconductor layers included in both the n-channel thin film transistor and the p-channel thin film transistor. In particular, in the case where a gate insulating layer (a GI film) is thin, specifically, where the thickness of the gate insulating layer is 10 nm or less, LDD regions are preferably formed in the p-channel transistor in order to increase the withstand voltage. The LDD regions may be formed using a formation method with a resist mask without the use of a sidewall insulating layer.

Next, after formation of a fourth insulating layer 1522 including hydrogen by a sputtering method, an LPCVD method, a plasma enhanced CVD method, or the like, hydrogenation treatment and activation treatment of the impurity element added to the semiconductor layers are performed. Heat treatment (at a temperature of 300° C. to 550° C. for 1 to 12 hours) in a furnace or an RTA method using a lamp light source is used for the hydrogenation treatment and the activation treatment of the impurity element. For example, a silicon oxynitride layer which is obtained by a plasma enhanced CVD method is used for the fourth insulating layer 1522 containing hydrogen. Here, the thickness of the fourth insulating layer 1522 containing hydrogen is set to from 50 nm to 200 nm. Further, in the case where the semiconductor layers are crystallized using a metal element which promotes crystallization, typically nickel, gettering which reduces nickel in the channel formation region can also be performed at the same time as the activation. Note that the fourth insulating layer 1522 containing hydrogen is a first layer of an interlayer insulating layer. In this embodiment, silicon oxynitride with a thickness of 50 nm is stacked as the fourth insulating layer and subjected to heat treatment at 550° C. for four hours as the hydrogenation treatment and the activation treatment of the impurity element (FIG. 16E).

Then, a fifth insulating layer 1523 is formed as a second layer of the interlayer insulating layer by a sputtering method, an LPCVD method, a plasma enhanced CVD method, or the like. An insulating layer in a single layer or stack layers such as a silicon oxide layer, a silicon nitride layer, and/or a silicon oxynitride layer is used as the fifth insulating layer 1523. Here, the thickness of the fifth insulating layer 1523 is 300 nm to 800 nm. In this embodiment, a stacked-layer structure of a 100-nm-thick silicon nitride oxide layer and a 600-nm-thick silicon oxynitride layer is formed and subjected to heat treatment at 410° C. for 1 hour, whereby the fifth insulating layer 1523 is formed (see FIG. 17A).

Then, a resist mask is formed over the fifth insulating layer 1523 and the fourth insulating layer 1522 and the fifth insulating layer 1523 are selectively etched, so that a first opening 1521 which reaches the first electrode 1509 is formed. Then, the resist mask is removed after etching. The diameter of the first opening 1521 may be approximately 1 μm to 6 μm. In this embodiment, the diameter of the first opening 1521 is 2 μm (see FIG. 17B).

Figure 17A:
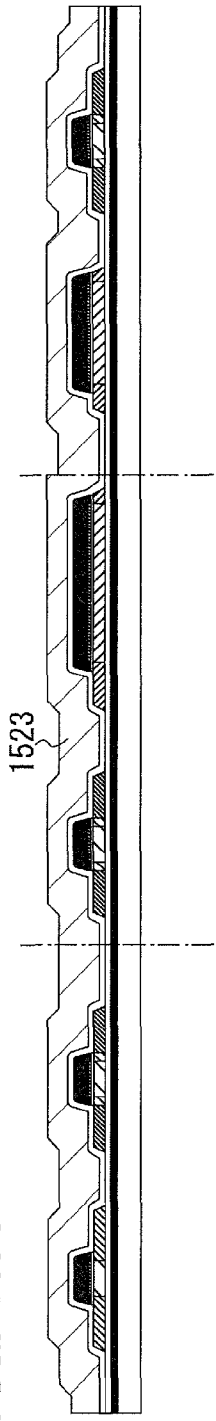
FIGS. 17A to 17C are cross-sectional views illustrating a method for manufacturing a semiconductor device in an embodiment of the invention.
Figure 17B:
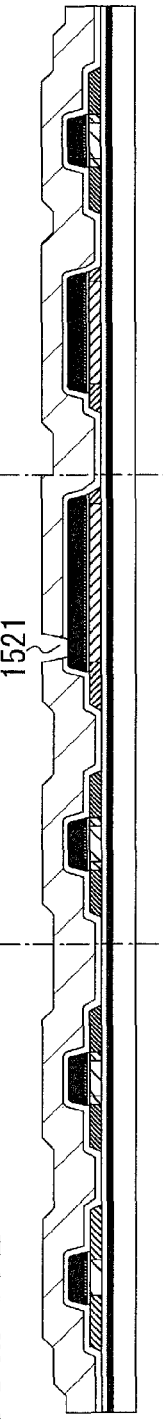
Figure 17C:
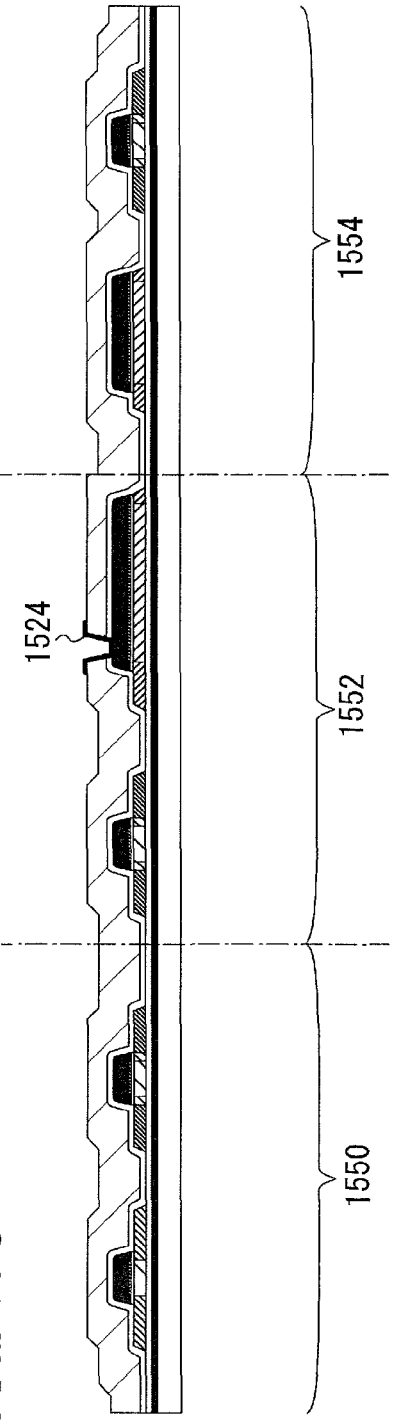
Figure 19A:
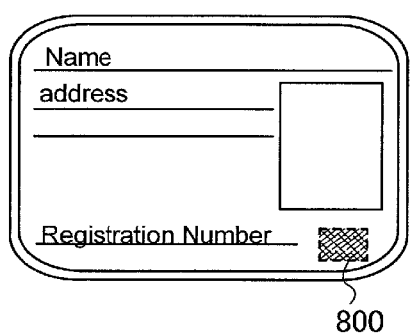
FIGS. 19A to 19F are views illustrating application examples of a semiconductor device in an embodiment of the invention.
Figure 19B:
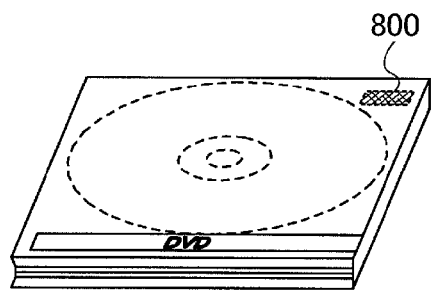
Figure 19C:
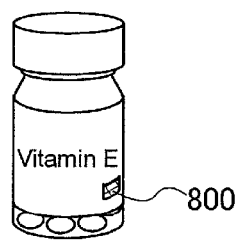
Figure 19D:
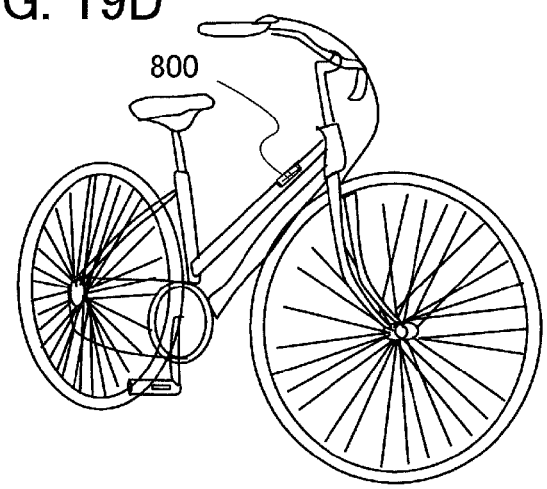
Figure 19E:
Figure 19F:
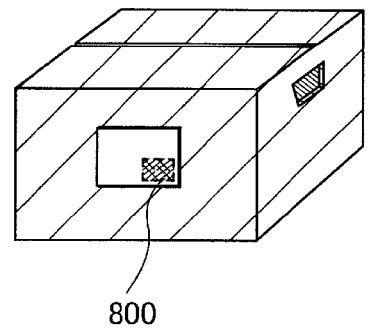

Next, a semiconductor layer used as a memory element, that is, a stacked-layer structure of a silicon oxynitride layer and an amorphous silicon layer is formed using a sputtering method, an LPCVD method, a plasma enhanced CVD method, or the like. In this embodiment, an amorphous silicon layer with a thickness of 15 nm and a silicon oxynitride layer with a thickness of 6 nm are stacked in that order by a plasma enhanced CVD method. Then, a resist mask is formed and the amorphous silicon layer and the silicon oxynitride layer are selectively etched, so that a stacked layer 1524 of the amorphous silicon layer and the silicon oxynitride layer, which overlaps with the first opening 1521, is formed. The stacked layer 1524 of the amorphous silicon layer and the silicon oxynitride layer serves as a resistant material layer of the memory element. The resist mask is removed after the etching (FIG. 17C).

Then, a resist mask is formed and the fourth insulating layer 1522 and the fifth insulating layer 1523 are selectively etched, so that contact holes 1592a to 1592j that reach the semiconductor layers, contact holes 1593a to 1593e that reach the gate electrodes, and a second opening 1594 that reaches the first electrode 1509 are formed. The resist mask is removed after the etching (FIG. 18A).

Then, oxide films formed on exposed surfaces of the semiconductor layers and on an exposed surface of the first electrode 1509 are removed with an etchant containing hydrofluoric acid, and at the same time, the exposed surfaces of the semiconductor layers and the exposed surface of the first electrode 1509 are washed.

Next, a conductive layer is formed by a sputtering method to form an upper electrode of the memory element, the source and drain electrodes of the thin film transistors, and the like. This conductive layer is formed to have a single layer or stacked layers of, as a material, a substance such as tungsten, titanium, aluminum, nickel, chromium, molybdenum, tantalum, cobalt, zirconium, vanadium, palladium, hafnium, platinum, or iron, or an alloy or a compound thereof. Note that this conductive layer is also used for the source and drain electrodes of the thin film transistors. Therefore, it is preferable to use a material which has relatively low contact resistance with the semiconductor layers of the thin film transistors. For example, a three-layer structure of a titanium layer, an aluminum layer containing a minute amount of silicon, and a titanium layer or a three-layer structure of a titanium layer, an aluminum alloy layer containing nickel and carbon, and a titanium layer is employed. In this embodiment, a three-layer structure of a 100-nm-thick titanium layer, a 350-nm-thick pure aluminum layer, and a 100-nm-thick titanium layer is employed. Further, this embodiment shows the example in which a tungsten layer is used as a material of the lower electrode of the memory element and a titanium layer is used as a material of the upper electrode. However, the materials are not particularly limited as long as they can change the state of the resistance material layer from a high resistance state to a low resistance state and the same material may be used for the upper electrode and the lower electrode of the anti-fuse. In the case where the lower electrode and the upper electrode of the anti-fuse are formed using the same material, they are formed to have a single-layer structure or a stacked-layer structure of a material which is selected from a substance such as tungsten, titanium, aluminum, nickel, chromium, molybdenum, tantalum, cobalt, zirconium, vanadium, palladium, hafnium, platinum, or iron, an alloy material or a compound material thereof.

Next, a resist mask is formed, and a conductive layer is selectively etched to form a conductive layer 1525, a conductive layer 1526, a conductive layer 1527, a conductive layer 1528, a conductive layer 1531, a conductive layer 1532 each serving as a source electrode or a drain electrode, a wiring 1529 serving as a bit line of a selection transistor, a wiring 1530 serving as a word line, a wiring 1535, a wiring 1536, and a wiring 1537 each serving as a gate lead wiring, a second electrode 1540 and a third electrode 1541 of the semiconductor memory circuit portion, a wiring 1533 and a wiring 1534 each serving as an electrode of the capacitor of the antenna portion, and a fourth electrode 1542 of the antenna portion. The second electrode 1540 of the semiconductor memory circuit portion overlaps with the first opening 1521 and serves as an upper electrode of the memory element and is electrically connected to the semiconductor layer 1574 to serve as one of electrodes of the assist capacitor. In addition, the third electrode 1541 overlaps with the second opening 1594 to be electrically connected to the first electrode 1509. Note that the fourth electrode 1542 is electrically connected to thin film transistors of the antenna portion, though the connection is not illustrated here. The resist mask is removed after the etching (FIG. 18B).

In this embodiment, the thin film transistor in the logic circuit portion 1550, a thin film transistor 1558 which serves as a selection transistor in the semiconductor memory circuit portion 1552, an assist capacitor 1559, a memory element 1560, and the thin film transistor in the antenna portion 1554 can be formed over the same substrate. Here, a cross-sectional view of the p-channel transistor and the n-channel transistor provided in the logic circuit portion 1550, the thin film transistor 1558 provided in the semiconductor memory circuit portion 1552, the assist capacitor 1559, the memory element 1560, the capacitor and the n-channel transistor provided in the antenna portion 1554, is illustrated. Note that the present invention is not particularly limited to this, and the thin film transistor provided in the semiconductor memory circuit portion 1552 may be a p-channel transistor. Further, a p-channel transistor may be provided in the antenna portion 1554. Here, one n-channel transistor is illustrated for convenience.

Next, a sixth insulating layer 1543 is formed to cover the thin film transistor of the logic circuit portion 1550, the thin film transistor and the memory element of the semiconductor memory circuit portion 1552, and the thin film transistor of the antenna portion 1554. An insulating layer containing silicon oxide or an insulating layer formed using an organic resin can be used as the sixth insulating layer 1543. The insulating layer containing silicon oxide is preferably used to improve reliability of the semiconductor device. Alternatively, in the case where an antenna to be formed later is formed by a screen printing method, an insulating layer formed using an organic resin, which can be formed by a coating method, is preferably used because the sixth insulating layer 1543 preferably has a planarized surface. The material for forming the sixth insulating layer 1543 may be selected by a practitioner as appropriate. Further, the antenna to be formed later may be formed so as to reach a region which overlaps with the logic circuit portion 1550 and the semiconductor memory circuit portion 1552. In this case, the sixth insulating layer 1543 also functions as an interlayer insulating layer for insulation from the antenna. In the case where the antenna has a circular shape (for example, a loop antenna) or a spiral shape, one of two ends of the antenna is led by an underlying wiring; thus, it is preferable to provide the sixth insulating layer 1543. However, in the case where a microwave method is employed and the antenna has a linear shape (for example, a dipole antenna), a flat shape (for example, a patch antenna), or the like, the antenna to be formed later can be arranged so as not to overlap with the logic circuit portion and the semiconductor memory circuit portion; thus, the sixth insulating layer 1543 is not necessarily provided.

Then, a resist mask is formed, and the sixth insulating layer 1543 is selectively etched, so that a third opening 1595 that reaches the third electrode 1541 and a fourth opening 1596 that reaches the fourth electrode 1542 are formed. The resist mask is removed after the etching (FIG. 18C).

Next, a metal layer is formed over the sixth insulating layer 1543. As the metal layer, a single layer selected from Ti, Ni and Au or stacked layers thereof can be used. Then, a resist mask is formed, and the metal layer is selectively etched, so that a lead wiring 1544 for the first electrode 1509 is formed and a base layer 1545 for the antenna is formed. Note that the lead wiring 1544 and the base layer 1545 here can be selectively formed by a sputtering method using a metal mask without using the resist mask, as well. When the base layer 1545 for the antenna is provided, a large contact area with the antenna can be secured. In addition, the lead wiring 1544 is not necessarily formed depending on a layout of a circuit design. The lead wiring 1544 is connected, as a cathode, to a ground power source.

Next, an antenna 1546 is formed over the base layer 1545 for the antenna. The antenna 1546 can be formed by such a method in which a metal layer of Al, Ag, or the like is formed by a sputtering method and then is selectively etched into a desired shape. Alternatively, the antenna 1546 can be formed by a screen printing method. A screen printing method is as follows: by using a screen plate, in which a base which is made of a metal mesh or a high molecular compound fiber mesh and is provided with a predetermined pattern formed by a photosensitive resin, and a rubber, plastic, or metal blade which is called a squeegee, an ink or a paste which is provided on the screen plate is transferred to a work which is placed on the opposite side of the screen plate. A screen printing method has a merit that pattern can be formed in a relatively large area at low cost (see FIG. 18D).

In this embodiment, the thin film transistor of the logic circuit portion 1550 and the thin film transistor and the memory element of the semiconductor memory circuit portion 1552, and the thin film transistor and the antenna of the antenna portion 1554 are formed over the same substrate.

Next, the separation layer 1502 and the support substrate 1501 are removed by separation. Separation can occur inside the metal oxide layer, at an interface between the first insulating layer 1503 and the metal oxide layer, or an interface between the metal oxide layer and the separation layer 1502, so that a portion which is above the first insulating layer 1503 and which will serve as the semiconductor device can be separated from the support substrate 1501 with relatively little force. When the separation layer 1502 and the support substrate 1501 are removed, a fixing substrate may be attached to the side where the antenna is provided.

Then, one sheet in which a plurality of semiconductor devices is formed is divided to provide individual semiconductor devices by a cutter, a dicer, or the like. By using a method by which each semiconductor device is picked up and separated, this cutting step is not needed.

Next, the semiconductor device is fixed to a sheet-like substrate. For the sheet-like substrate, plastic, paper, a prepreg, a ceramic sheet, or the like can be used. The semiconductor device may be fixed so as to be interposed between two sheet-like substrates, or the semiconductor device may be fixed to one sheet-like substrate with an adhesive layer. For the adhesive layer, various curable adhesives such as a reactive curable adhesive, a thermosetting adhesive, a photo curable adhesive such as an ultraviolet cure adhesive, or an anaerobic adhesive can be used. Alternatively, the semiconductor device can be provided in the middle of making paper, so that the semiconductor device can be provided inside one piece of paper.

Through the above process, a semiconductor memory device and a semiconductor device can be formed concurrently. Thus, simplification of the manufacturing process and reduction in size of the semiconductor device having the semiconductor memory device can be achieved. In addition, the logic circuit portion 1550, the semiconductor memory circuit portion 1552, and the antenna portion 1554 are formed over the same substrate, whereby malfunction in writing or reading data can be reduced.

Note that the manufacturing method of the semiconductor device described in this embodiment is an example, and another manufacturing method of a semiconductor device can also be employed.

This embodiment can be combined with any of the other embodiments, as appropriate.

Embodiment 7

In this embodiment, application examples of the semiconductor device of one embodiment of the present invention will be described.

Specific usage examples of the semiconductor device of one embodiment of the present invention will be described with reference to FIGS. 19A to 19F. FIGS. 19A to 19F are diagrams illustrating usage examples of the semiconductor device in this embodiment.

Usage examples of the semiconductor device including a semiconductor device of any of the above embodiments are described with reference to FIGS. 19A to 19F. As illustrated in FIGS. 19A to 19F, the semiconductor device can be used widely and can be used by being provided for, for example, bills, coins, securities, bearer bonds, certificates (e.g., driver's licenses or resident cards, see FIG. 19A), or objects such as containers for wrapping (e.g., wrapping paper or bottles, see FIG. 19C), recording media (e.g., DVDs or video tapes, see FIG. 19B), vehicles (e.g., bicycles, see FIG. 19D), personal belongings (e.g., bags or glasses), foods, plants, animals, clothes, daily commodities, or electronic devices (e.g., liquid crystal display devices, EL display devices, television sets, or mobile phones), or shipping tags of the objects (see FIGS. 19E and 19F).

A semiconductor device 800 of one embodiment of the present invention is fixed to products by, for example, being mounted on a printed board, being attached to a surface thereof, or being embedded therein. For example, the semiconductor device 800 is incorporated in paper of a book or an organic resin package to be fixed to each object. As for the semiconductor device 800 of one embodiment of the present invention, a small size, a thin shape, and lightweight are achieved and an attractive design of the object itself is not damaged even after being fixed in the object. In addition, when the semiconductor device 800 which is one embodiment of the present invention is provided in bills, coins, securities, bearer bonds, certificates, or the like, a certification function can be obtained and forgery thereof can be prevented by using the certification function. Further, when the semiconductor device which is one embodiment of the present invention is attached to containers for wrapping, recording media, personal belongings, foods, clothes, daily commodities, electronic devices, or the like, a system such as an inspection system can be efficiently used. Furthermore, when the semiconductor device which is one embodiment of the present invention is attached to vehicles, safety against theft or the like can be increased.

As described above, when a semiconductor device of one embodiment of the present invention is used for each application given in this embodiment, for example, high reliability can be realized. Accordingly, authentication characteristics, security, or the like of an object can be improved.

This application is based on Japanese Patent Application serial no. 2009-202672 filed with Japan Patent Office on Sep. 2, 2009, the entire contents of which are hereby incorporated by reference.

What is claimed is:

1. A driving method of a semiconductor device comprising an antenna,
a control circuit,
an input circuit,
a first memory to which writing can be performed once,
a second memory to which writing can be performed once, and
a third memory to which writing can be performed once,
wherein the first memory includes a first sector including a plurality of bits, the second memory includes a second sector including a plurality of bits, and the third memory includes a third sector including a plurality of bits,
wherein the first sector, the second sector, and the third sector are electrically connected to one another through the control circuit,
the driving method comprising the steps of:
receiving first information, first data and second data by the antenna through wireless communication,
inputting the first information to the control circuit by the input circuit and holding the first information in the control circuit;
determining whether the first sector holds the first data and whether the third sector holds the second data by the control circuit;
in a case where the first sector holds the first data and the third sector holds the second data, not inputting the first information to the second sector from the control circuit and not holding the first information in the second sector;
in a case where the first sector does not hold the first data and the third sector does not hold the second data, inputting the first data to the first sector from the control circuit and holding the first data in the first sector; inputting the first information to the second sector from the control circuit and holding a second information in the second sector after holding the first data in the first sector;
comparing the first information and the second information by the control circuit;
in a case where the first information does not correspond to the second information, repeating input of the first information to the second sector and comparison between the first information and the second information by the control circuit until the first information corresponds to the second information; and
in a case where the first information corresponds to the second information, inputting the second data to the third sector from the control circuit, and holding the second data in the third sector,
wherein the first sector functions as a test sector of writing data provided for determining whether power is sufficiently input for writing data to the second sector.

2. The driving method of a semiconductor device according to claim 1, wherein the memory is an OTP memory or a write-once memory.

3. The driving method of a semiconductor device according to claim 1, wherein when the information is held, the sector does not suffer a physical change.

4. A driving method of a semiconductor device comprising an antenna,
an input circuit,
a control circuit, and
a memory to which writing can be performed once,
wherein the memory includes a first sector including a plurality of bits, a second sector including a plurality of bits, and a third sector including a plurality of bits,
wherein the first sector, the second sector, and the third sector are electrically connected to one another through the control circuit,
the driving method comprising the steps of:
receiving first information, first data and second data by the antenna through wireless communication, inputting the first information to the control circuit by the input circuit and holding the first information in the control circuit;

determining whether the first sector holds the first data and whether the third sector holds the second data by the control circuit;

in a case where the first sector holds the first data and the third sector holds the second data, not inputting the first information to the second sector from the control circuit and not holding the first information in the second sector;

in a case where the first sector does not hold the first data and the third sector does not hold the second data, inputting the first data to the first sector from the control circuit and holding the first data in the first sector; inputting the first information to the second sector from the control circuit and holding a second information in the second sector after holding the first data in the first sector;

comparing the first information and the second information by the control circuit;

in a case where the first information does not correspond to the second information, repeating input of the first information to the second sector and comparison between the first information and the second information by the control circuit until the first information corresponds to the second information; and in a case where the first information corresponds to the second information, inputting the second data to the third sector from the control circuit, and holding the second data in the third sector, wherein the first sector functions as a test sector of writing data provided for determining whether power is sufficiently input for writing data to the second sector.

5. The driving method of a semiconductor device according to claim 4, wherein the memory is an OTP memory or a write-once memory.

6. The driving method of a semiconductor device according to claim 4, wherein when the information is held, the sector does not suffer a physical change.

* * * * *